United States Patent [19]

Gasperi et al.

[11] Patent Number: 4,916,640
[45] Date of Patent: Apr. 10, 1990

[54] VIDEO IMAGE PROCESSING SYSTEM

[75] Inventors: Michael L. Gasperi, Racine; Richard M. Roszkowski, Brookfield; Donald J. Christian, New Berlin; Joseph E. Deklotz, Genesee, all of Wis.

[73] Assignee: Allen-Bradley Company, Inc., Milwaukee, Wis.

[21] Appl. No.: 57,797

[22] Filed: Jun. 3, 1987

[51] Int. Cl.⁴ .............................................. H04N 7/18
[52] U.S. Cl. ...................................... 364/521; 382/45; 382/48; 382/51
[58] Field of Search ............... 364/516, 517, 560, 521, 364/513, 474.22–474.27; 382/8, 28, 38, 45, 48, 50, 51

[56] References Cited

U.S. PATENT DOCUMENTS

| | | |
|---|---|---|
| 3,903,357 | 9/1975 | Woolfson et al. |
| 3,918,049 | 11/1975 | Snyder et al. ........................... 382/51 |
| 4,400,728 | 8/1983 | Long .................................... 357/107 |
| 4,409,661 | 10/1983 | Romanski ............................. 364/516 |
| 4,450,579 | 5/1984 | Nakashima et al. .................... 382/8 |
| 4,491,962 | 1/1985 | Sakou et al. ......................... 382/8 X |
| 4,545,070 | 10/1985 | Miyagawa et al. .................... 382/48 |
| 4,550,435 | 10/1985 | Hayman .............................. 382/51 X |
| 4,555,801 | 11/1985 | Miyagawa et al. .................... 382/44 |
| 4,566,126 | 1/1986 | Miyagawa et al. .................... 382/48 |
| 4,569,079 | 2/1986 | Yoshida ................................. 382/1 |
| 4,570,181 | 2/1986 | Yamamura ........................... 358/160 |
| 4,672,676 | 6/1987 | Linger ............................... 382/45 X |
| 4,731,856 | 3/1988 | Lloyd et al. ........................... 382/8 |
| 4,783,827 | 11/1988 | Izumi ................................ 382/48 X |

Primary Examiner—Gary V. Harkcom
Assistant Examiner—Mark K. Zimmerman
Attorney, Agent, or Firm—Quarles & Brady

[57] ABSTRACT

A module for a programmable controller is adapted to process a video image to evaluate characteristics of an object within the image. A processor converts an analog video signal into four binary images. A memory stores data defining a separate sensor region for each binary image. A set of four counters is provided to tabulate the pixels of one color in each binary image that lie within the associated sensor region. A video signal sensor measures variation of the luminance of the video signal. The processor uses the luminance variation measurement to adjust the binarization of the video signal to produce normalized binary images under varying lighting conditions.

20 Claims, 28 Drawing Sheets

CPU SECTION

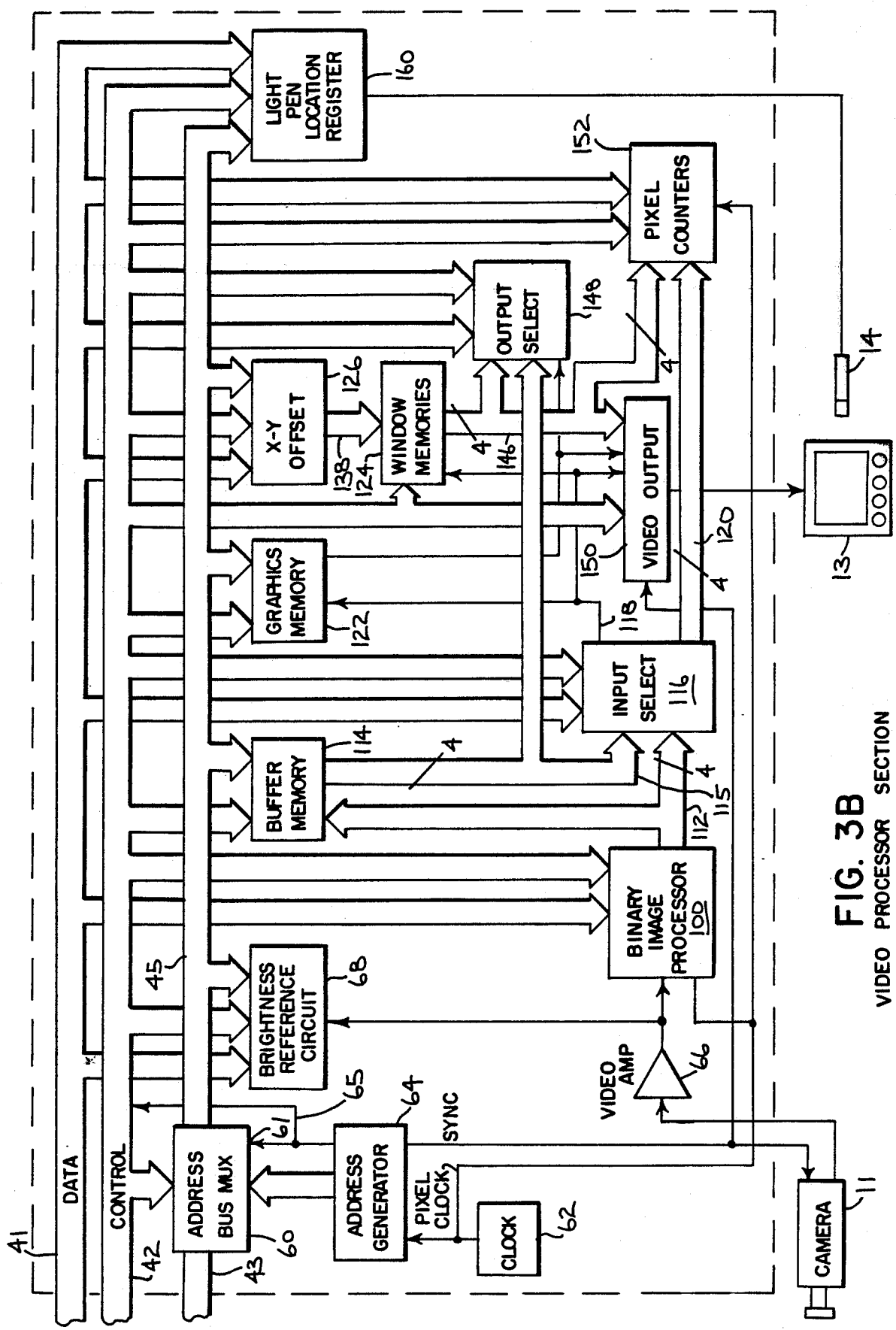
FIG. 3B VIDEO PROCESSOR SECTION

FIG. 8
BRIGHTNESS PROBE
DATA BLOCK

| MSB | LSB | WORD |
|---|---|---|
| X | Y | 1 |
| REFERENCE | ENABLE | 2 |
| MIN | MAX | 3 |

FIG. 9
SENSOR WINDOW
DATA BLOCK

| MSB | LSB | WORD |
|---|---|---|
| X | Y | 1 |
| MINIMUM VALUE || 2 |
| MAXIMUM VALUE || 3 |
| FLAGS | THRESHOLD | 4 |
| VARIABLE || 5 |
| TOTAL NO. OF PIXELS || 6 |

FIG. 10
LINE GAUGE
DATA BLOCK

| MSB | LSB | WORD |
|---|---|---|
| X | Y | 1 |
| MIN 1 | MAX 1 | 2 |
| MIN 2 | MAX 2 | 3 |
| FLAGS | FUNCTION | 4 |
| LENGTH | DATUM LOCATION | 5 |

LIGHT PEN
ROUTINE

WINDOW ADJUST
ROUTINE

MOVE ROUTINE

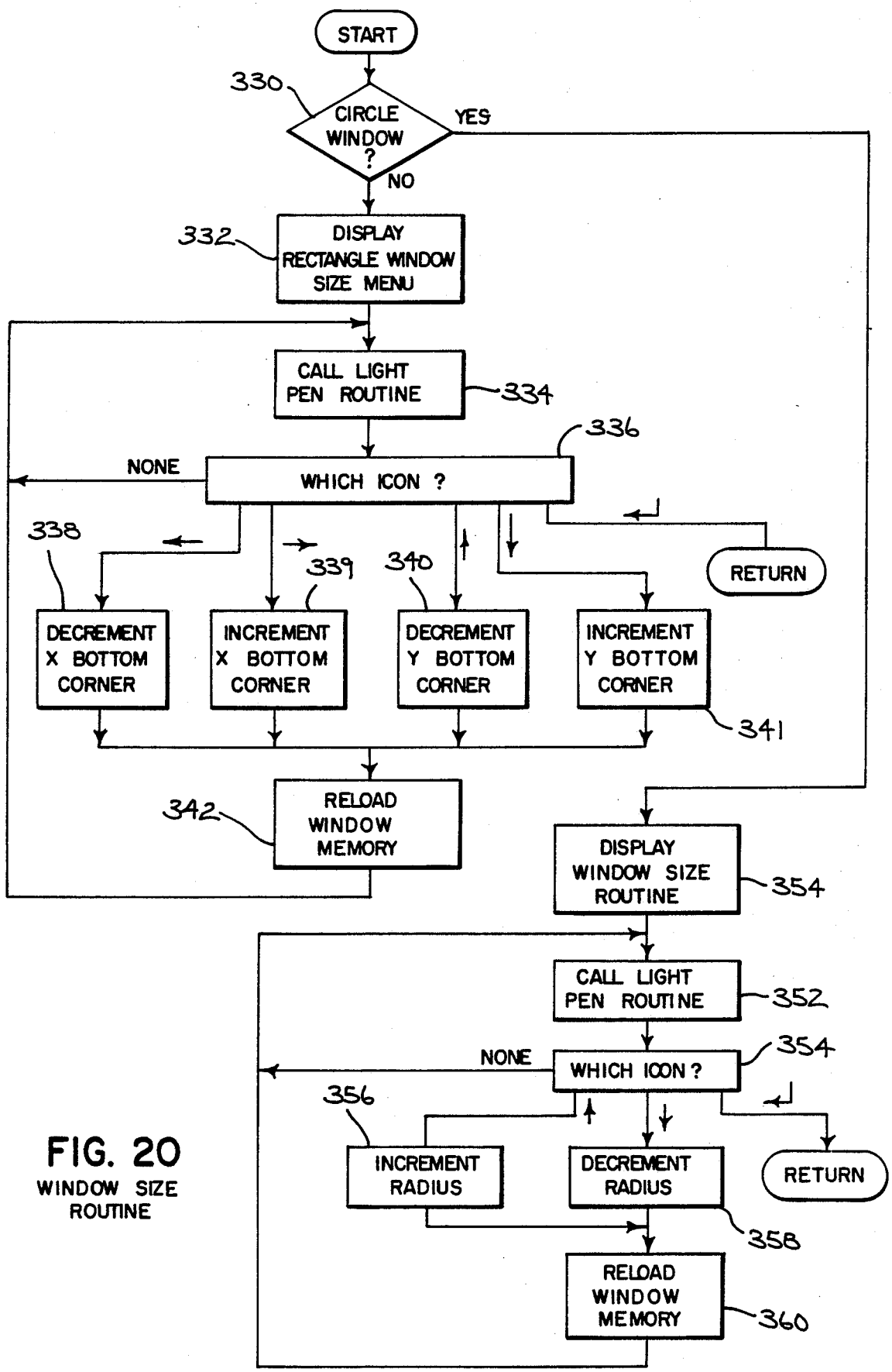
FIG. 20 WINDOW SIZE ROUTINE

LINE GAUGE ROUTINE

LINE ADJUST
ROUTINE

BRIGHTNESS PROBE ROUTINE

| WORD | | |
|---|---|---|
| 1 | BRIGHTNESS PROBE AND WINDOW RANGE ALARMS | 171 |
| 2 | LINE GAUGE RANGE ALARMS | 172 |
| 3 | BRIGHTNESS PROBE LUMINANCE LEVEL | 173 |
| 4 | WINDOW 1 PIXEL COUNT | 174 |
| 5 | WINDOW 2 PIXEL COUNT | 175 |
| 6 | WINDOW 3 PIXEL COUNT | 176 |
| 7 | WINDOW 4 PIXEL COUNT | 177 |
| 8 | LINE GAUGE 1 PRIMARY RESULT | 178 |
| 9 | LINE GAUGE 1 SECONDARY RESULT | 179 |
| 10 | LINE GAUGE 2 PRIMARY RESULT | 180 |
| 11 | LINE GAUGE 2 SECONDARY RESULT | 181 |
| 12 | LINE GAUGE 3 PRIMARY RESULT | 182 |
| 13 | LINE GAUGE 3 SECONDARY RESULT | 183 |
| 14 | LINE GAUGE 4 PRIMARY RESULT | 184 |
| 15 | LINE GAUGE 4 SECONDARY RESULT | 185 |
| 16 | LINE GAUGE 5 PRIMARY RESULT | 186 |
| 17 | LINE GAUGE 5 SECONDARY RESULT | 187 |
| 18 | LINE GAUGE 6 PRIMARY RESULT | 188 |
| 19 | LINE GAUGE 6 SECONDARY RESULT | 189 |
| 20 | STATUS | 190 |

FIG. 29

IMAGE PROCESSING OVERVIEW

FIXED LINE GAUGE ROUTINE

X OFFSET CALCULATION

FLOATING LINE GAUGE ROUTINE

THRESHOLD ADJUSTMENT AND ERROR REPORTING ROUTINE

VIDEO IMAGE PROCESSING SYSTEM

The present invention relates to video signal processing systems for evaluating objects present in the video image, and more particularly to such devices which may be used in conjunction with automated manufacturing equipment.

BACKGROUND OF THE INVENTION

As automated assembly equipment and robots become more sophisticated, it is desirable to add the sense of vision to such devices. This would enable the equipment to locate the position of the object being manufactured as well as inspect the object for the presence of components or the proper location and size of specific features such as holes. To this end video cameras have been employed to generate a video image of the workpiece which then can be electronically analyzed.

One of the problems that is encountered in vision systems used with an automated assembly process is that the workpieces may vary in position as they move along a conveyor system or other type of material handling equipment. Typically, in order for the workpiece to be properly evaluated, it must be accurately positioned with respect to the video camera. When the proper location is critical in conventional manufacturing systems, the workpiece is placed in a fixture which locates it very accurately with respect to the manufacturing equipment such as a component insertion machine. However this fixture adds expense and time to the manufacturing process.

Human beings working on an assembly line do require that the workpiece be accurately aligned with respect to them. People are able to recognize the location of the various components within their field of view and adapt to variations in location as different workpieces placed in front of them. It is desirable to afford a vision system with this attribute of the human assembly worker enabling it to tolerate some degree of workpiece misalignment.

SUMMARY OF THE INVENTION

A vision input module according to the present invention receives a video signal representing a video image of an object to be evaluated. The module has an apparatus for defining several sensing areas of the video image within which the characteristics of the image pixels are evaluated to detect various features of the object. For example, the pixels in a sensing area having a luminance above a given threshold value are counted. The pixel count can be compared to predefined minimum and maximum values to determine if the characteristic of the evaluated feature falls within an acceptable tolerance range.

Included in an embodiment of the vision input module is a means for determining difference between the actual position of the object and a datum position. The module then uses the difference in position to shift the sensing areas the same amount and in the same direction as the object has shifted from the datum position. This insures that the sensing areas will have the same alignment to each object being evaluated.

An object of the present invention is to provide a vision input module which can be incorporated into conventional programmable controllers. Such a module responds to commands from the programmable controller and provides data regarding the image being processed in a format similar to other sensory data being inputted into the programmable controller. For example, sending an indication to the programmable controller as to whether the sensed parameter is within a given tolerance range.

Another object is to have a vision input module within which all of the video processing occurs and which reports the results of the processing to a programmable controller.

A further object is to incorporate a mechanism in a video image processing system to compensate for shifts in the location of an object in the image from its nominal location.

Yet another object is to provide a system which processes four different binarized versions of a video image in parallel.

An object of the invention is to provide a vision module for a programmable controller which is easily configured for its specific task by personnel familiar with programmable controllers. No complex computer languages or command sets need be learned to configure the vision input module. The configuration of the module is consistent with concepts familiar to control engineers.

BRIEF DESCRIPTION OF THE DRAWINGS

FIG. 8 is an illustration of the data structure for the configuration parameters of the vision input module brightness probe;

FIG. 9 is an illustration of the data structure for the configuration parameters of each sensor window for the vision input module;

FIG. 10 is an illustration of the data structure for the configuration parameters of a vision input module line gauge;

FIG. 20 is a flowchart of the window size change software routine;

FIG. 29 is an illustration of the data structure within the memory of the vision imput module that contains the results of the video processing;

DETAILED DESCRIPTION OF THE PRESENT INVENTION

Figure 1:
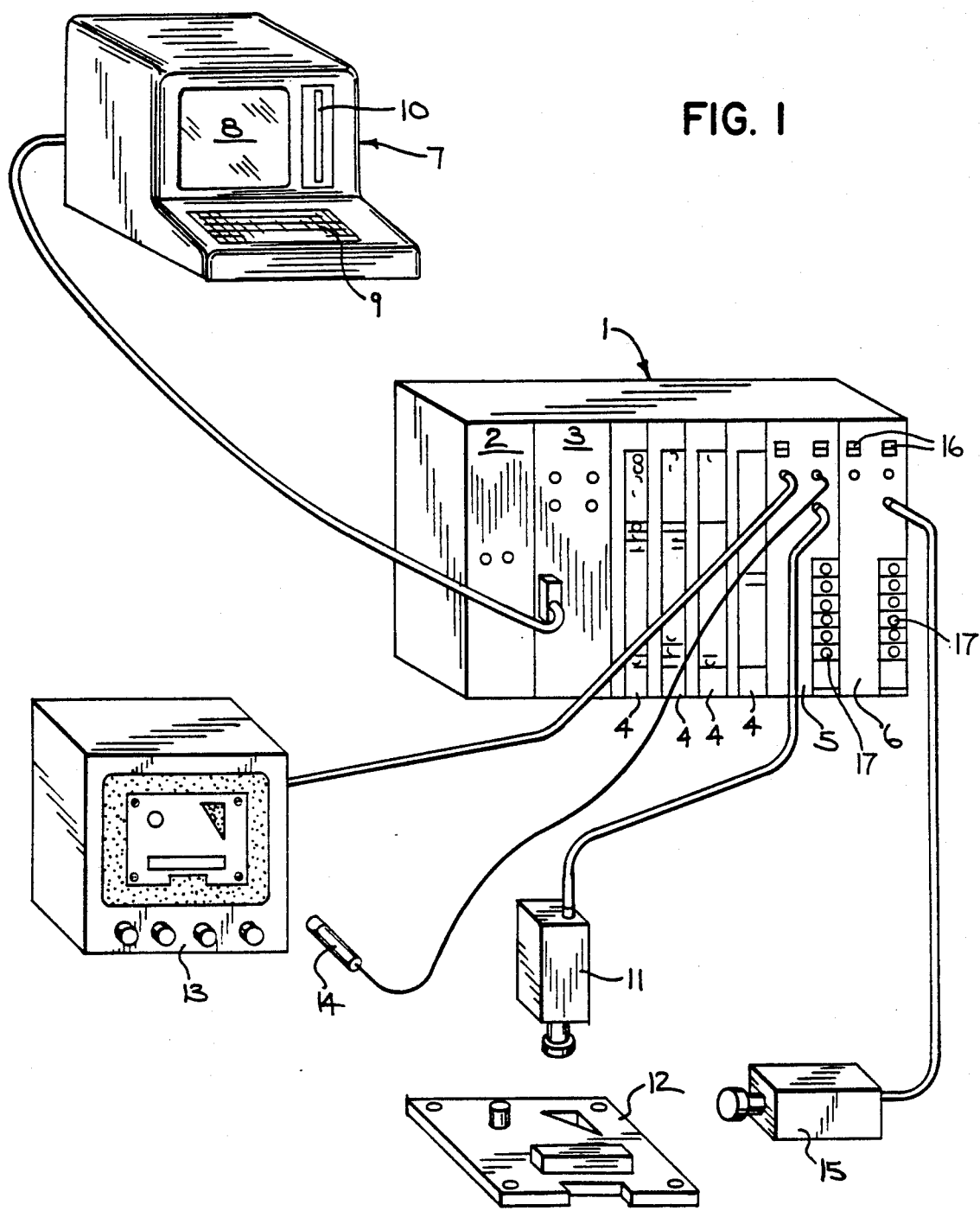
FIG. 1 is a pictorial representation of a programmable controller system according to the present invention.

With initial reference to FIG. 1, a programmable controller incorporating the present invention is housed in a rack 1 which includes a series of slots that receive various modules 2-6. These modules electrically connect to a mother board which extends along the back surface of the rack 1 to provide a backplane. The physical construction of the rack 1 is disclosed in U.S. Pat. No. 4,151,580. The modules include a power supply module 2 and a processor module 3. The processor module 3 is connected by a cable to a programming terminal 7 which includes a keyboard 9 through which the user may program the processor module 3 or monitor its operation. Alphanumeric data as well as ladder diagram representations of equipment control programs are produced on a CRT display 8, and programs and data may be stored on a floppy disk which is received in a disk drive unit 10. For a more detailed description of an programmable controller of this type, reference is made to U.S. Pat. No. 4,442,504.

Several of the modules 4-6 in rack 1 perform input/output (I/0) functions connecting the programmable controller system to the controlled equipment. For example, the system in FIG. 1 has four conventional electrical input/output modules 4 and two novel vision input modules 5 and 6. The I/0 modules 4 take many forms and may include, for example, d.c. inputs or outputs, a.c. inputs or outputs, analog inputs or outputs, and/or open and closed loop positioning modules.

Each vision module 5 and 6 occupies two slots in rack 1 coupling to the backplane connectors for each slot. The first vision input module 5 connects via a cable to a black and white vision camera 11 which is aimed at a workpiece 12 from above. The workpiece 12 may be carried under the camera 11 by an assembly line conveyor (not shown). The first vision input module 5 produces a 256×256 pixel video image of the workpiece which is displayed on the cathode ray tube of a monitor 13 connected to that module. Light pen 14 is used to input data by selecting symbols displayed from time to time on monitor 13, as will be described.

The second vision input module 6 has another camera 15 connected to it, which is located to view the side of the workpiece 12. Although the second vision input module 6 provides terminals for a video monitor and light pen neither one is connected to it. These devices typically are only necessary in the setup phase during which the various features to be sensed and the areas within the image at which the sensing will occur are defined.

The two vision input modules 5 and 6 also have a number of front panel indicator lights 16 for displaying the functional status of the module. Several electrical terminals 17 are also located on the front panel. These terminals provide a external trigger input into the module, camera power, a strobe light trigger output signal, a module busy output signal and a master evaluation decision output signal indicating whether the workpiece passed or failed the overall evaluation.

The vision input modules (VIM) 5 and 6 process the images from their respective cameras 11 and 15 and generate data regarding selected features of the object. As will be described in detail, the VIM processes the video image from the camera to derive four separate binary images. Each binary image is produced by comparing the luminance of each pixel of the video image to a threshold value and setting the corresponding pixel in the binary image to either black or white. A binary image has no intermediate grey scale luminance values.

The VIM operator defines up to four sensing areas, or windows, in the video image. Each window is associated with a different binary image. The VIM counts either the black or white binary image pixels within the windows. From these counts the size, shape and position of various workpiece features may be determined. The operator can also set a range of acceptable pixel counts for each window. Four output alarm flags indicate whether the four counts are within their respective ranges. A master evaluation decision alarm flag indicates whether all of the counts fall within their ranges or whether any one has failed.

The operator can also define up to six horizontal or vertical line sensors and assign each one to one of the four binary images. The line sensors are implemented by software which enables different evaluation functions to be performed on the pixels along each line. For example, the black and white pixels can be counted or the number of black and white groups of pixels, called blobs, can be counted. Ranges of acceptable result values may be set, as was done with respect to the window sensors The results of the line and window sensor processing are made available to the processor module 3 in the rack. The processor can obtain either the range alarm flags or the full set of sensor results. The processor module 3 uses the data from the VIM to evaluate the acceptability of the workpiece 12 and to control further manufacturing steps that are performed on it.

VIM Hardware

Before describing the functional operation of one of the VIM's further, an understanding of its circuitry is necessary. The vision input module 5 comprises a CPU section shown in FIG. 3A and a video processor section shown in FIG. 3B. The CPU section is built around three common buses 41, 42 and 43 for data, address and control signals respectively. Actually the control bus 42 is a series of discrete conductor lines running between various components in both sections of the vision module 5. The data bus 41 is eight bits wide and the address bus is sixteen bits wide. A microprocessor 44 is connected to all three buses 41–43 and controls the operation of the VIM by executing a program stored in read only memory (ROM) 46. The microprocessor 44 has a separate parallel port that is directly coupled to a front panel input/output (I/O) interface circuit 50. The I/O interface circuit 50 connects the indicator lights 16 and electrical terminals 17 on the front panel of the VIM (FIG. 1) to the microprocessor 44.

A random access memory (RAM) 47 is coupled to the VIM buses 41–43 to provide storage for data transferred to and from the processor module 3 in the rack 1, as well as to store the results of the VIM's evaluation of a workpiece. An EEPROM 54 is also connected to the three buses 41–43 in order to provide a non-volatile memory for storing configuration data set by the controller operator.

Also located in the CPU section is a backplane interface circuit 52 coupled to the three internal buses 41–43. The backplane interface circuit is similar to circuits employed in conventional I/O modules for programmable controllers and couples the VIM 5 to the rack backplane for the exchange of data with other modules 3, 4 and 6. As noted previously, the vision input module occupies two rack slots. The backplane connectors 55 and 56 for the two slots are coupled to the backplane interface circuit 52. The processor module 3 in the rack 1 can access the VIM 5 via either slot connector depending upon the type and amount of data desired.

One of the rack slot connectors 55 is coupled to a commercially available bus interface integrated circuit, such as a Texas Instruments Inc. 74651 device. This circuit provides two eight-bit data latches, one for storing a data byte from the VIM and the other one for storing a data byte from the processor module 3. The VIM 5 and the processor module 3 can access these latches to read the data stored by the other device. Each bit has the function shown in the following table:

| Bit | Source | Function |
| --- | --- | --- |
| 0 | Processor | VIM Setup Enable |
| 1 | VIM | VIM Fault |
| 2 | VIM | Communication Fault |
| 3 | Processor | Trigger VIM |
| 4 | VIM | VIM Busy |
| 5 | VIM | Brightness Probe Alarm |

-continued

| Bit | Source | Function |
| --- | --- | --- |
| 6 | VIM | X-Y Position Alarm |
| 7 | VIM | Master Decision Alarm |

The bits set by the processor module place the VIM in various modes of operation, whereas the bits set by the VIM provide indications to the processor module 3 of various events. Bit 3 is set by the processor module to trigger the VIM to acquire a video frame for processing. Bit 5 indicates that the luminance of the video image is outside a predefined range. Bit 6 indicates that the workpiece has shifted to far from a datum location for the VIM to compensate. The value of bit 7 indicates whether the results of the image evaluation were all satisfactory or whether at least one of the result values was outside a predefined range.

The other rack slot connector 56 is coupled to a circuit for transferring blocks of data between the VIM RAM 48 and the processor module 3. This circuit is similar to those incorporated in previous programmable controller I/0 modules which gathered and transferred blocks of data. The technique employed to carry out this transfer is similar to that described in U.S. Pat. No. 4,293,924 entitled "Programmable Controller with High Density Intelligent I/0 Interface". The backplane interface circuit 52 allows the transfer of data in both directions. This not only enables the data representing the results of the VIM's evaluation to be sent to the processor module 3, but also enables the processor module to send or receive VIM configuration data.

An address decode circuit 53, which is coupled to the address bus 43, receives each address issued by the microprocessor 44 and produces a set of control signals on control lines 42 for the VIM component being addressed. As will be seen, the microprocessor 44 via address decode circuit 53 produces the necessary control signals to place the video processor section in various modes of operation. Alternatively the address decode circuit can be part of the video processor section.

The control lines 42 as well as the data and address buses 41 and 43 respectively are coupled to the video processor section. As shown in FIG. 3B the data and control buses 41 and 42 extend from the CPU section throughout the entire video processor section. However, the CPU address bus 43 is coupled to an input of an address bus multiplexor 60. The other input of multiplexor 60 is connected to the output from an address generator 64. A signal on a select input 61 determines which source of address signals is coupled by the multiplexor 60 to the video processor address bus 45.

A clock 62 generates a pulsed output signal having a frequency which determines the pixel rate of the video signal from camera 11. The clock signal is coupled to the input of address generator 64 which counts the clock pulses to produce a sixteen bit parallel address signal. This address signal is at times coupled by the address bus multiplexor 60 to the video processor address bus 45 to address image memories connected to that bus. The most significant byte (MSB) of the address signal represents the pixel line number of the stored image and the least significant byte (LSB) represents the pixel column number across the horizontal line of the image. A conventional video synchronization signal (sync) is also produced by the address generator 64 for the camera 11. The address generator 64 produces a signal on line 65 which indicates the occurrence of the vertical retrace interval in the synchronization signal for camera 11. Line 65 is coupled to the select input 61 of the multiplexor 60 so that the CPU addresses bus 43 is coupled to the video processor bus 45 during vertical retrace. Line 65 is also coupled via control bus 42 to microprocessor 44.

Figure 4:
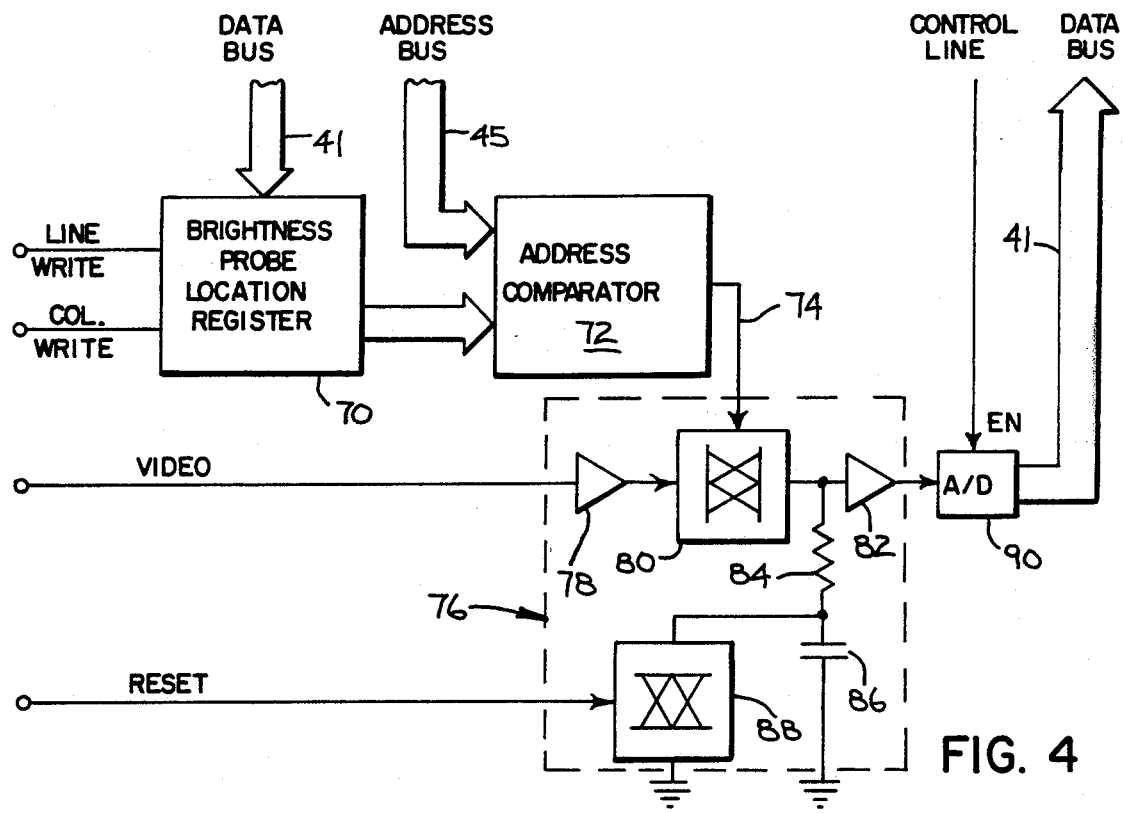
FIG. 4 is a schematic block diagram of the brightness reference circuit, in FIG. 3B.

The video output from camera 11 is amplified by a video amplifier 66 whose output is connected to a brightness reference circuit 68. The brightness reference circuit 68 senses the luminance in an eight by eight pixel area 26 (referred to herein as a brightness probe) to provide compensation for variation in the illumination of the objects in the video image from camera 11. The details of the brightness reference circuit are shown in FIG. 4. The data bus 41 is coupled to the input of a brightness probe location register 70 which stores the position of the probe within the image. This register 70 has two eight bit storage locations into which a byte from the data bus 41 may be written. One location stores the upper byte, or pixel line number, of the location address of the brightness probe and the other storage location contains the lower byte, or column number. Because this probe 26 is a predefined area of eight by eight pixels, it may be positioned at any location of a 32 by 32 location grid on the image. As a result, the location of the brightness probe can be specified by the five most significant bits of the pixel line number and the five most significant bits of the pixel column number.

The five most significant bits of each byte stored in location register 70 are coupled to one input of a comparator 72. The video processor address bus 45 is connected to the other input of the comparator 72. The comparator 72 compares the five most significant bits of the upper bytes from the address bus 45 and location register 70, and the five most significant bits of the lower bytes from these sources. The output of the comparator on line 74 indicates when the pixels addressed on the video processor address bus 45 are within the brightness probe sensing area.

The output of the comparator 72 is coupled to an enable input of a sample and hold circuit 76. This circuit 76 consists of an isolation amplifier 78 having an input coupled to the output of video amplifier 66. The output of the isolation amplifier 78 is coupled through a transmission gate 80 to an output amplifier 82. The transmission gate 80 is controlled by the output signal from the address comparator 72. A series connection of resistor 84 and capacitor 86 extends between the transmission gate output and ground. The capacitor 86 stores a charge representative of the average luminance level of the pixels within the brightness probe area. A second transmission gate 88 is connected in parallel with the capacitor 86 to remove the stored charge in response to a reset signal from microprocessor 44 over a line of control bus 42.

The output of the sample and hold circuit 76 from output amplifier 82 is connected to an input of an eight bit analog to digital (A/D) converter 90. The A/D converter 90 is enabled by a signal on a line of control bus 42 from address decoder 53 to couple the digitized version of the stored average luminance to the data bus 41. The output of A/D converter 90 is a digital number from zero to 255 which is coupled to the data bus 41.

Figure 5:
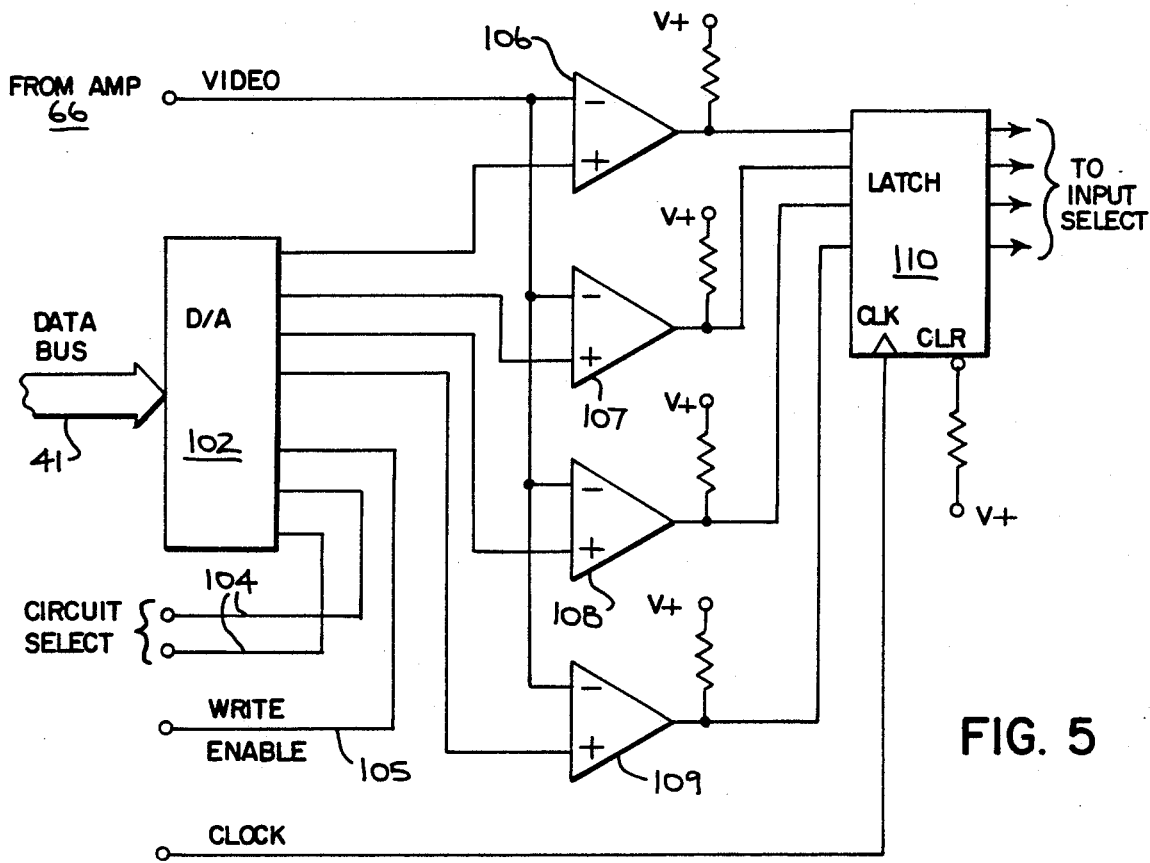
FIG. 5 is a schematic block diagram of the binary image processor in FIG. 3B.

Referring again to FIG. 3B the video output of the amplifier 66 is also connected to a binary image processor 100. The image processor 100 produces four different binary video images from the camera's analog video signal. The image processor 100 receives the pixel rate signal from clock 62 and is coupled to the data bus 41 and control lines 42. The details of the binary image processor 100 are shown in FIG. 5. The data bus 41 is connected to the input of a quad digital to analog (D/A) converter 102, such as integrated circuit model AD7226 manufactured by Analog Devices, Inc. The input to each of the quad D/A converters is coupled to a separate digital data latch in the integrated circuit. An eight bit digital number representing the reference voltage level for each converter is stored in the corresponding latch. This is accomplished by selecting the latch via circuit select lines 104. The data is then sent over the data bus 41 by microprocessor 44 while a write enable pulse is applied to the converter 102. The circuit select lines 104 and the write enable line 105 are part of the control bus 42 and originate at the address decoder 53.

In the operating state the quad D/A converter 102 applies the analog versions of the latch contents to the noninverting input of four voltage comparators 106–109. The inverting input of each comparator 106–109 is coupled to the video signal from amplifier 66 (FIG. 3B). The outputs from the four comparators 106–109 are coupled to separate inputs of a four bit output latch 110. The output latch 110 receives the pixel clock signal, each pulse of which causes the latch 110 to store the output bit from each comparator 106–109.

The outputs of latch 110 represent four binarized versions of the video image produced by the binary image processor 100. In order to produce the binary images, four different luminance threshold values, one for each image, are stored in the latches of D/A converter 102. The analog version of each threshold is applied to one of the voltage comparators 106–109 as a reference value. As the analog video from camera 11 is applied to the comparators 106–109, each one produces a binary output having a value that corresponds to whether the luminance of the video signal is above or below the reference threshold. The binary output is sampled for every pixel by quad output latch 110 to produce an output signal representing the binary image. The output of latch 110 provides the output for the binary image processor 100.

As shown in FIG. 3B, the four binary image output signals from the image processor 100 are connected by a four line bus 112 to the data input of a buffer memory 114. The buffer memory 114 comprises four 64K memory circuits each storing one of the 256×256 pixel binary output images from the image processor 100. The buffer memory is connected to the video processor address bus 45 and receives read and write control signals from control lines 42. As will be seen, certain functions of the VIM cannot be performed in real time. As a result, these functions evaluate the binary images stored in the buffer memories 114. This evaluation then does not have to be conducted at the video scan rate.

The outputs from the binary image processor 100 and from the buffer memory 114 are connected as separate inputs to an image input select circuit 116. The data bus 41 is also coupled as an input to the input select circuit 116. In response to signals from the address decoder 53 via control bus lines 42, the input select circuit couples one of the output lines from either the buffer memory 114, the image processor 100 or the data bus 41 to an image output line 118. Another portion of the input select circuit 116 responds to signals on other control bus lines 42 to couple the four output lines from either the buffer memory 114 or the binary image processor 100 to four lines of counter bus 120.

The image output signal on line 118 is connected to the data input terminal of a 64K graphics memory 122. The video processor address bus 45 and various control lines 42 are connected to the graphics memory 122. The graphics memory stores a 256×256 pixel image that contains icons and alphanumeric characters produced by the CPU section for display on the monitor 13. The image output signal on line 118 is also connected to the data input terminal of window memories 124, which comprise four separate 64K binary image memories. This provides storage for the separate binary images which define the four sensing windows, as will be described. The window memories 124 have their data inputs connected in common to the image output line 118 from the input select circuit 116. The address terminals of the window memories 124 are connected in common to the output of an X-Y offset circuit 126.

Figure 6:
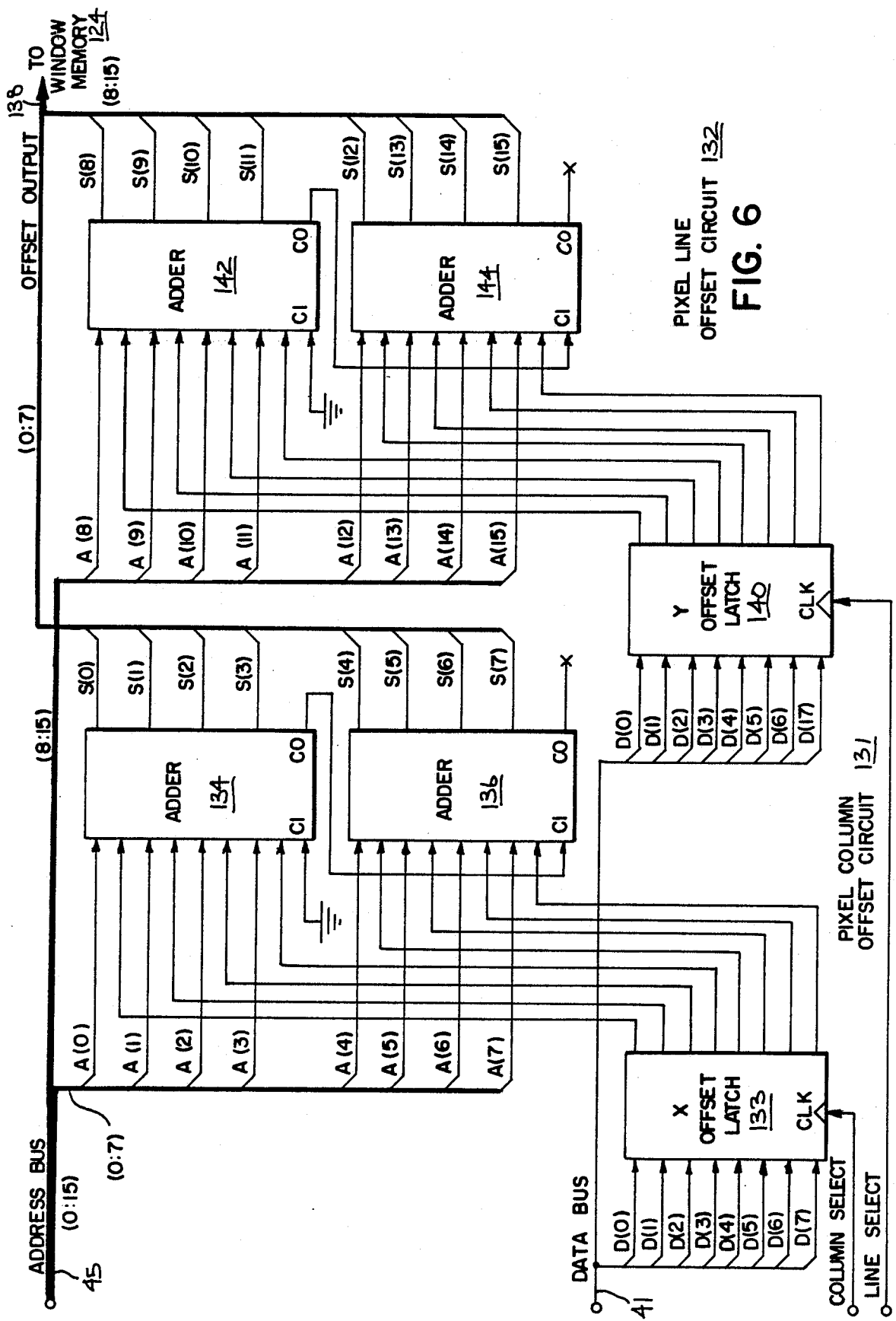
FIG. 6 is a schematic block diagram of the X-Y offset circuit in FIG. 3B.

The X-Y offset circuit 126, shown in detail in FIG. 6, provides compensation for shifts in the position of the workpiece being evaluated from its datum position in the video image. The X-Y offset circuit stores a measurement of the number of pixel locations that the workpiece 12 has shifted in the horizontal and vertical directions. These numbers are added to the addresses for the window memories 124 to effectively shift the position of the windows to correspond to a shift in the workpiece from its datum location. This maintains the proper alignment of the sensor windows with the workpiece.

The X-Y offset circuit 126 is divided into pixel column and pixel line offset circuits 131 and 132, respectively, which provide horizontal and vertical (X and Y) adjustment of the sensor windows to match shifts in the workpiece position. The pixel column offset circuit 131 includes an X offset data latch which is coupled to the data bus 41. The X offset data latch 133 stores an eight bit number and its sign representing the number of pixel positions that the object has shifted horizontally from its datum position. This number is derived from a line gauge sensor as will be described. The X offset data latch 133 receives a column select write signal from the address decoder 53 via the control lines 42.

The four least significant bits of the X offset data latch output are connected to one set of inputs of a first four-bit column adder 134. The first column adder 134 also receives the four least significant bits (bits 0-3) of the video processor address bus 45. The four output bits of the first column adder 134 are connected to bit lines 0-3 of a sixteen bit parallel output bus 138 which is connected to the address input of the window memory 124. The carry output (CO) of the first column adder 134 is coupled to the carry input (CI) of a second column adder 136. The one set of addition inputs of the second column adder 136 are connected to the four most significant bits of the X offset latch 133 output. The other set of adder inputs are coupled to bit lines 4-7 of the video processor address bus 45. The output lines of the second column adder 136 are coupled to bit lines 4-7 of the offset output bus 138.

The pixel line offset circuit 132 is similar to the column offset circuit 131 except that it processes the eight most significant bits of the image address which represents the pixel line number of the image. A Y offset latch 140 is coupled to the data bus 41 to store an eight bit vertical offset of the object. This offset represents the number of pixels that the workpiece 12 has shifted from its datum position in the vertical direction of the image. The storage of the Y offset is enabled by a write signal on the line select conductor of control lines 42 which originates at the address decoder 53. The four least significant bits of the output of the Y offset latch 140 are coupled to one set of inputs of a first four-bit line adder 142. The other set of inputs is coupled to bit lines 8-11 of the video processor address bus 45. The four bit output of the first line adder 142 is connected to bit lines 8-11 of the offset output bus 138. The carry output (CO) of the first line adder 142 is connected to the carry input (CI) of a second line adder 144. The second line adder 144 receives as one input the four most significant bits of the output from the Y offset latch 140 and bit lines 12-15 of the video processor address bus 45 as another input. The output of the second line adder 144 is coupled to bit lines 12-15 of the offset output bus 138.

Returning to FIG. 3B, the window memories 124 are coupled to the control lines 42 and receives four write enable signals, one for each window memory, from the address decode 53. The four outputs from the window memories are coupled via an output bus 146 to an input of an output select switch 148. The output of the graphics memory 122 is also coupled to an input of the output select switch 148. Another input of the output select switch 148 is coupled to the four output lines 115 from the buffer memory 114. In response to signals from the address decoder 53 over the control lines 42, the tri-state output select switch 148 couples either the output from the buffer memory 114, the graphics memory 122, or the window memory 124 to the data bus 41. This enables the microprocessor 44 to read the contents of these memories.

A video output circuit 150 receives inputs from the input select circuit 116, the graphics memory 122 and the four image output lines of window memories 124. In response to a selection signal from the address decoder 53 over control lines 42, the video output circuit 150 selects one or a combination of the input lines. The digital image data on the selected input line or lines is converted to an analog video signal and outputted to monitor 13. If the video output circuit 150 simultaneously selects outputs from the input select circuit 116, the graphics memory 122 and the window memory 124, the image displayed on monitor 13 is a super-imposition of all three input images. The output of the graphic memory 122 lies over the other input images.

Figure 7:
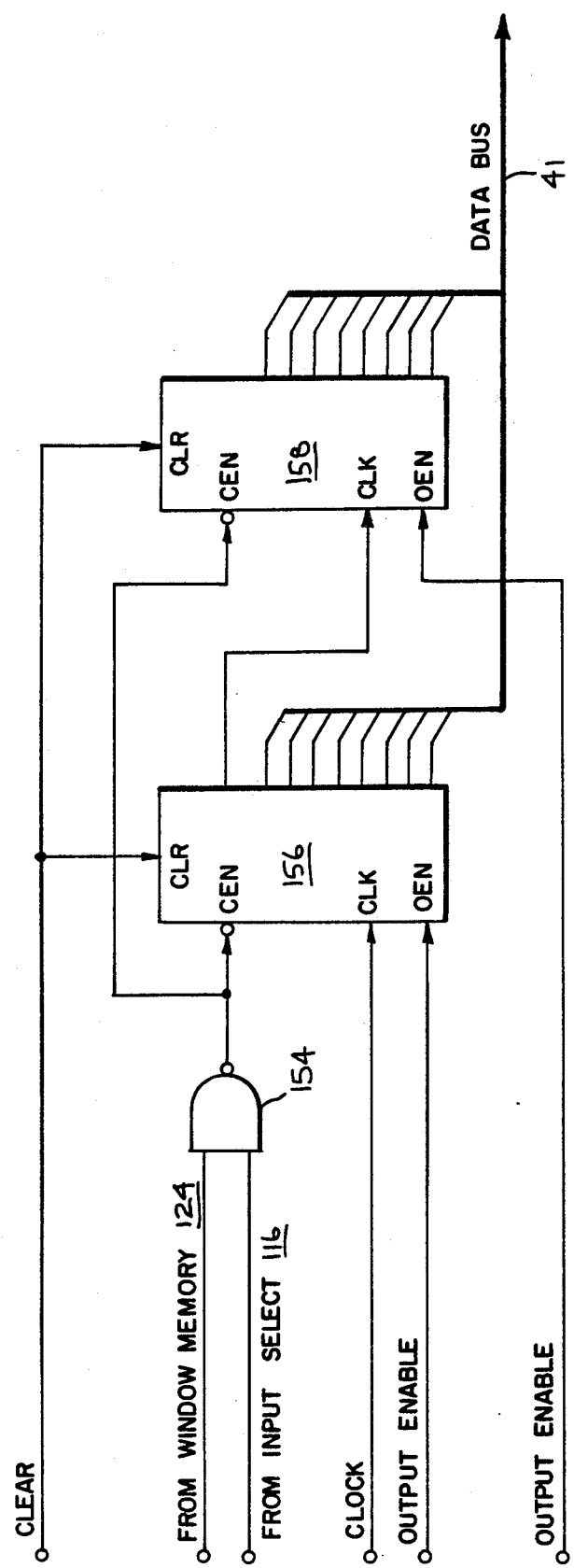
FIG. 7 is a schematic block diagram of one of the pixel counters in FIG. 3B.

A set of four pixel counters in circuit 152 logically AND each of the four binary images from the input select circuit 116 with one of the window images stored in window memories 124. FIG. 7 shows one of the four counter stages in the pixel counter circuit 152. An output line from the window memories 124 and an output line from the input select circuit 116 are coupled to the inputs of NAND gate 154. The output of NAND gate 154 is coupled to the count enable terminals of two eight bit counter stages 156 and 158. The two counter stages are connected in cascade with the carry output of the first counter stage 156 connected to the clock terminal of the second counter stage 158 to create a sixteen bit counter. The clock terminal of the first counter stage is coupled to the pixel rate clock signal from clock 62. Each counter stage 156 and 158 receives a separate output enable signal from address decoder 53 and a common clear signal over control lines 42. The eight bit output from each counter stage 156 and 158 is connected to the data bus 41. The count in counter stages 156 and 158 is incremented whenever the pixels from the window memories 124 and the input select circuit 116 are both high logic levels. The pixel counter tabulates the white pixels of the video image that are within the window.

The light pen 14 is coupled to the enable input of a light pen location register 160 in FIG. 3B. If the light pen 14 is pressed against the screen of monitor 13, it produces an output when the cathode ray is scanning the position on the screen where the pen is located. The output from the light pen 14 enables the location register 160 to store the address from the video processor address bus 45 for that screen position. At the same time a flag bit is set in the location register 160 to indicate that a new light pen location has been stored. The CPU section can test this flag to determine if the light pen was activated. The location register 160 can then be addressed to read out the new location of the light pen 14.

FUNCTIONAL DESCRIPTION

Figure 2:
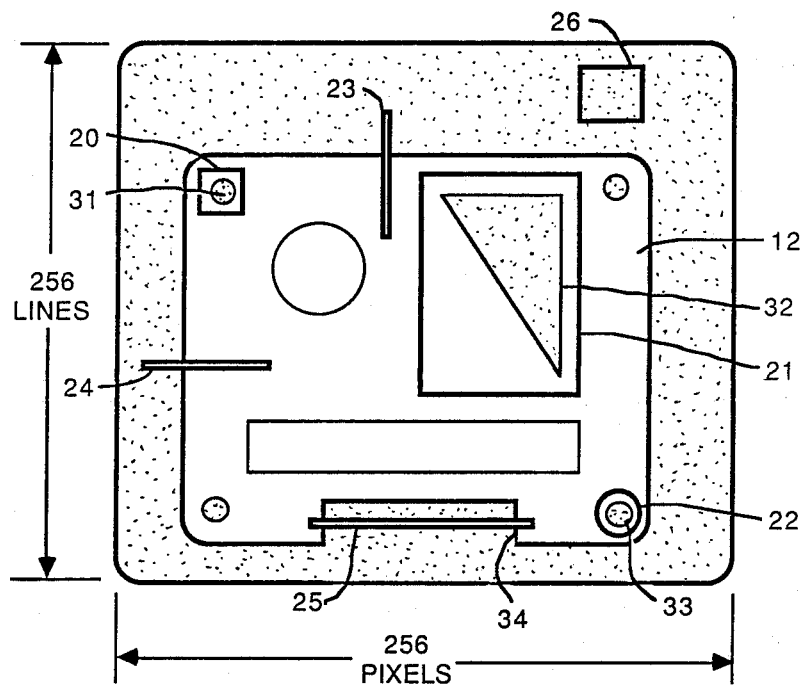
FIG. 2 is a representation of the video image produced by the system in FIG. 1.

As noted above, the VIM circuitry processes a video image using a number of sensors located in various parts of the image. The image picked up by the video camera 11 (and 15) consists of 256 scan lines each having 256 pixels, thereby forming 256 columns of pixels. This permits the image information to be stored in a memory having 65,536 (64K) storage locations. An example of a VIM image as displayed on monitor 13 is shown in FIG. 2. In actuality the useable video image has less than 256 lines due to lines occurring during the vertical retrace interval. However, by convention such images are still referred to as having 256 lines. The workpiece 12 is imaged against a dark background to provide a high level of contrast between the workpiece 12 and its background which greatly enhances the image processing. The image displayed on monitor 13 also contains indicia representing various operator defined sensor locations for processing the video signal. Up to six linear sensing regions (referred to herein as line gauges) and up to four two dimensional sensing areas (called windows) may be defined. Various characteristics of the pixels within these defined sensor regions are tested and data sent to the rack's processor module 3.

Three window sensors 20–22 are shown in the image of FIG. 2 positioned over various portions of the workpiece 12. For example, the first sensor window 20 is a square shaped area located over an aperture 31 in the upper left hand corner of the workpiece 12 as it is positioned in the video image. The second sensor window 21 also is rectangular shaped and is positioned over a triangular aperture 32 in the central portion of the workpiece. The final sensor area 22 is circular in shape and is positioned over an aperture 33 in the lower right hand corner of the workpiece. The fourth sensor window of the VIM is not active in this example. For ease of illustration the sensing windows are shown by heavy lines forming the rectangular or circular shape of the window. In practice, each window is displayed on the monitor 13 as a brighter rectangular or circular area of the image.

The circuitry of the video processor section in FIG. 3B generates four separate binary images, one for each window sensor. To generate the binary images the luminance of the video signal from camera 11 is compared to four threshold values by the binary image processor 100. For each binary image, the pixels are either white or black depending on whether the luminance for the corresponding pixel in the video signal is above or below the threshold respectively. The video processor section pixel counters 152 tabulate the white pixels that are within the sensor window that corresponds to the given binary image. A range of pixel count values can be specified to indicate whether the count is acceptable or not. This enables the VIM to determine if the size of a feature, such as aperture 31 (FIG. 2), is within a specified dimensional tolerance.

Two line gauge sensors 23 and 24 are designated as edge sensors on the video image. Each line gauge is one pixel wide and several (e.g. 50) pixels long. The first edge sensor 23 extends vertically in the image and the second edge sensor 24 extends horizontally. The vertical line gauge sensor 23 detects the horizontal upper edge of the workpiece and the horizontal line gauge sensor 24 detects the left vertical edge of the workpiece. Each of the edge sensors, as defined for the image in FIG. 2, simply detects the first transition from black to white pixels. The number of pixels from an end of the line gauge to this transition indicates the position of the workpiece 12 within the video image.

A third line gauge sensor 25 is positioned near the bottom of the video image over a rectangular indentation 34 in the bottom edge of the workpiece 12. The third line gauge 25 provides a much more complex sensing mechanism than those of the edge sensors 23 and 24. For example, the number of dark pixels along the third line gauge 25 can be counted to determine the length of the indentation 34. In addition, the number of white pixels from the beginning of the third line gauge 25 to the edge of the workpiece 12 can be counted to determine the position of the indentation. The remaining three line gauge sensors provided by the VIM have not been enabled for use in this example.

In addition to the four user definable sensor areas within the video image, a brightness reference probe window 26 is located near the top of the image. This probe consists of a predefined eight by eight pixel square within which the luminance of the pixels is averaged to provide an indication of the relative level of illumination on the workpiece 12. The measurement is then used by the VIM to compensate for changes in the illumination, as well as being used as another measurement parameter of the workpiece 12.

Data regarding the configuration brightness probe 25, sensor windows and line gauges is archived in EEPROM 54. A working copy of this data is also stored in RAM 48. This data specifies parameters, such as the location, size, shape and measurement function, for each of the sensors. This parameter data is used to configure the video processor section. In addition the software for the VIM uses this data in its processing of the video image.

The parameters defining the brightness probe 26 are stored in a configuration data block consisting of three 16 bit words as illustrated in FIG. 8. The first word contains the X and Y image pixel address coordinates of the upper left corner of the brightness probe. These coordinates are contained in the separate bytes of the first word. The second word of the block contains an enable bit in its least significant byte (LSB) which indicates whether brightness sensing is active. This bit is set or reset by the operator during system configuration. The most significant byte (MSB) of the second word contains a reference brightness probe value that was measured during the setup of the VIM.

The third word of the data block contains minimum and maximum acceptable values for the brightness probe luminance measurement as defined by the VIM operator. If the probe is enabled these values provide a tolerance range. When the measured luminance is outside of this range, a flag bit is set elsewhere in RAM 48 (FIG. 3A) indicating that this test has failed.

Each of the four sensor windows has its configuration parameters stored in a separate six word data block located in RAM 48 as illustrated in FIG. 9. The first word of the block has a byte for the X and the Y pixel address coordinates of the window. In the case of a rectangular window, these are the pixel line and column bytes of the address for the pixel in the top left corner of the window. For a circular window these are the bytes of the address for the circle's center. The next two words are the minimum and maximum values for the pixel count tolerance range. The MSB of the fourth word is a series of flag bits which indicate whether window is enabled, and its shape (rectangular or circular). Another pair of flag bits indicate whether the window will be shifted, or floated, in the X and Y directions to correspond to shifts in the workpiece from the datum position. The MSB also contains a flag bit which designates whether white or black pixels within the window are to be counted. The LSB of the fourth word contains the reference threshold that is used by processor 100 to derive the binary image for this window. The reference threshold is determined during the VIM setup.

The last two words of the window data block store parameters which vary depending on whether the window is rectangular or circular. For a rectangular window the fifth word contains bytes for the X and Y coordinates of the lower right corner which defines the size of the rectangle. For a circular window one byte of the fifth word contains the circle's radius. The other byte of the fifth word contains the white or black pixel counting flag. The sixth word contains the number of pixels in the window thereby defining its size.

The final type of sensor is the line gauge which is defined by a configuration data block in EEPROM 54 that is depicted in FIG. 10. The first word of its data block contains the X and Y coordinates of the left end of the line gauge which defines the position of the line within the image. Each of the next two words contain minimum and maximum range values for the results of two tests which are conducted on the pixels along the line gauge. The MSB of the fourth word contains flag bits indicating whether the line gauge is enabled, and whether it is horizontal or vertical. Two additional flag bits indicate whether the line gauge will float in the X and Y directions or whether it is a source of the float data representing the location of an edge of the workpiece 12. If the line gauge is a source of the float data, its position is fixed in the image. Two more flag bits indicate which of the four binary images will be used with this sensor.

The LSB of the fourth word of the line gauge data block designates the measurement function to be performed on the pixels along the line gauge. Each function actually performs two measurements on the pixels. The basic functions are:

Count White Pixels and Black Pixels
First Edge Location and Width of First White Blob
First Edge Location and Width of First Black Blob
Last Edge Location and Width of Last White Blob
Last Edge Location and Width of Last Black Blob
Number of White Blobs and Number of edges
Number of Black Blobs and Number of edges A blob is one pixel or a group of contiguous pixels of the same color preceded and followed by a pixel of the other color. The line gauges are implemented in software. Therefore, additional functions can be provided by providing the necessary software routines. The number of bits used to designate the function permit a large number of operations to be defined.

The fifth word of the line gauge parameter data block has a byte that specifies coordinate for the end of the line. This is the Y coordinate for a vertical line gauge or the X coordinate for a horizontal line gauge. If this line gauge is used as the source of the X or Y float data, the other byte of the fifth word contains the datum location of the workpiece edge. For example, in the case of a vertical line gauge used as the source for the Y float, this byte contains the number of pixels from the upper end of the line to the edge of the workpiece. This number sets the datum position of the workpiece in the Y, or vertical, direction. The datum position value is stored in this byte during the setup phase.

The parameters contained in the configuration data blocks for the sensors is used by the software to set up the video processor section shown in FIG. 3B. As will be described in detail with reference to the operation of the VIM this data configures the brightness reference circuit 68, binary image processor 100, and window memories 124.

VIM Configuration

Figure 3A:
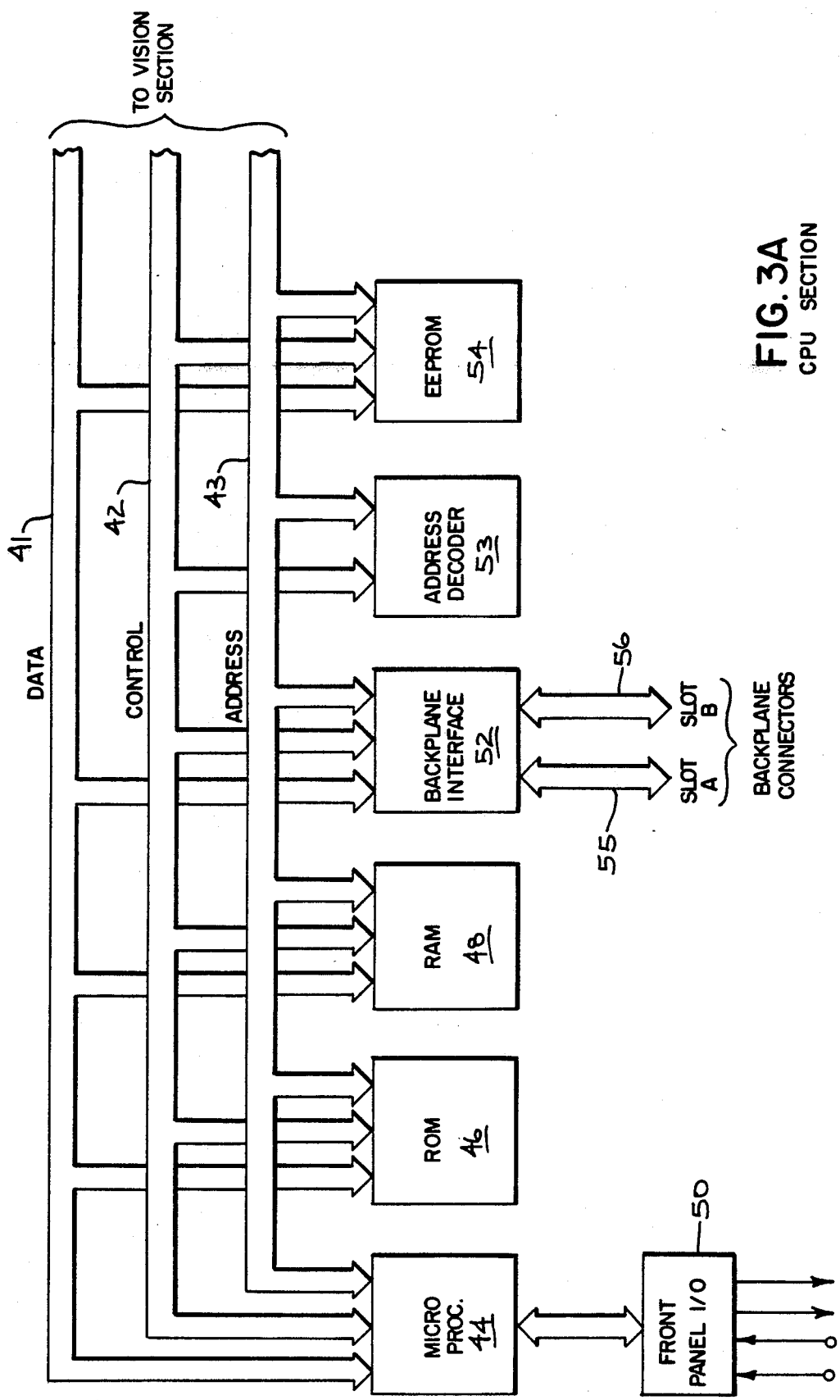
FIGS. 3A and B are schematic block diagrams of the two sections of the vision input module in the programmable controller of FIG. 1.
Figure 11:
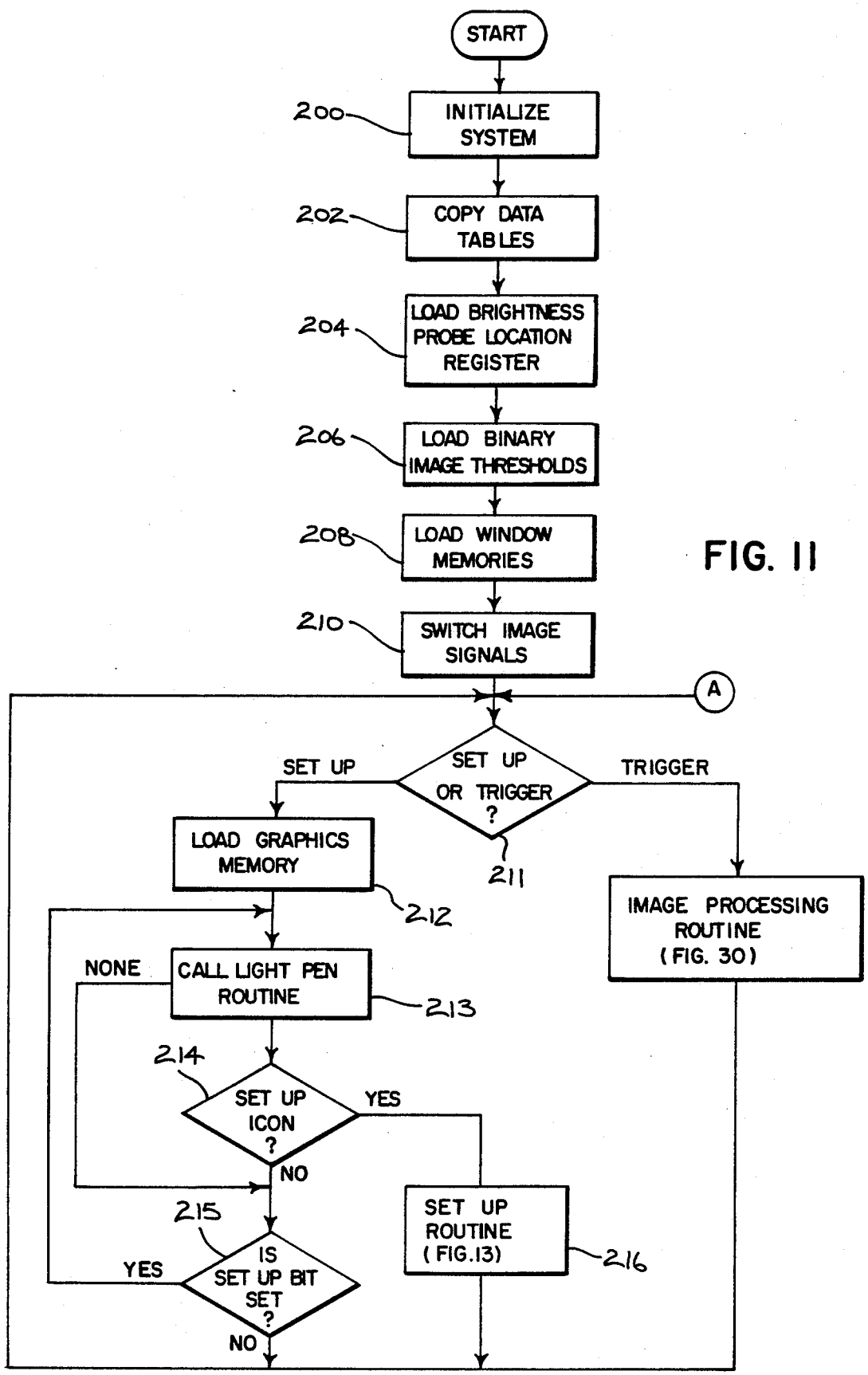
FIG. 11 is a flowchart of the vision input module initialization portion of the system start-up software routine.

When the VIM is powered up the software enters the start-up routine illustrated by the flowchart of FIG. 11. With reference also to FIGS. 3A and 3B, the routine enters an initialization phase at step 200 where the microprocessor 44 performs diagnostics on the VIM components. Communication parameters then are loaded from ROM 46 into the backplane interface 52.

Next, the configuration parameter data blocks for the sensors are copied from the EEPROM 54 into RAM 48 at step 202. This data represents the last configuration of the VIM. If the EEPROM 54 does not contain configuration data, either default data is used to configure the VIM or the program immediately transfers to the setup mode for operator configuration of the VIM. Alternatively, the set of configuration parameters could be transferred from the memory of the processor module 3 over the backplane into the VIM RAM 48. This latter technique permits several sets of parameters for different workpieces to be stored in the processor module memory and loaded into the VIM as the corresponding workpiece is to be processed.

An area in RAM 48 is also defined for storing the results of the evaluation of the workpiece. The data structure for this area is shown in FIG. 29. Five bits of the first sixteen-bit word 171 indicate whether the results from the brightness probe and the four sensor windows are within the respective range of acceptable values. The bits are low logic levels if the results are within the ranges. The second word 172 contains a similar indication for the six line gauge ranges. These single bit indications of whether the sensor results fall within the ranges are referred to as "alarms".

The remaining words of the results data block in RAM 48 contain the full value of the evaluation result for each of the sensors. The third word 173 contains a digital number from zero to 255 representing the average luminance measured by the brightness probe 26. The fourth through seventh words 174–177 contain the black or white pixel counts for the four sensor windows. These counts may range from zero to approximately 65535. As noted previously each analytical function selected for the line gauge sensors performs two operations on the pixels along the line. For example, both the black and white pixels can be counted. The results of the two operations for the first line gauge are stored in the eight and ninth words 178 and 179 of the results data block. The two results are designated as primary and secondary. The remaining words 180-189 contain the primary and secondary pixel operation results for the other five line gauges.

A final word 190 in the results data block in RAM 48 contains bits which indicate the status of various VIM components. This enables the processor module 3 to determine if a fault has occurred in the VIM.

After the results data storage area has been defined, the sensor configuration parameters in RAM 48 are employed to initially configure the video processor section shown schematically in FIG. 3B. During the configuration process, the address bus multiplexor 60 initially couples the CPU address bus 43 to the video processor address bus 45. At step 204 of FIG. 11, the microprocessor 44 sequentially reads the two bytes stored in the first word of the brightness probe data table (FIG. 8) which specifies the location of the probe in the video image. The two bytes are transferred via the data bus 41 to the brightness probe location register 70 within the brightness reference circuit (FIG. 4). Then, at step 206, the microprocessor 44 sequentially reads the threshold byte from the fourth word of each of the sensor window data tables (FIG. 9) and stores those thresholds in the registers of the quad D/A converter 102 in the binary image processor 100.

For each of the four sensor windows, the microprocessor 44 at step 208 then reads the information from the data table within RAM 48 specifying the location of the window and its size and shape (FIG. 8). The microprocessor uses this information to create a mask image of the window within the corresponding one of the window memories 124. To do this the microprocessor initially accesses the input select circuit 116 to connect one of the lines of the data bus 41 to the image output line 18 which is connected to the data inputs of the window memories 124. One of the control lines 42 is enabled to place the selected window memory in the write mode.

If the window is rectangular the microprocessor uses the X and Y coordinates in the first word of the configuration data table to define the upper left-hand corner of the rectangle. The X and Y coordinates of the rectangle's lower right-hand corner are contained in the fifth word of the table. Knowing the two diagonally opposed corners, the microprocessor 44 is able to determine the image addresses of the horizontal and vertical rectangle edges. Using a conventional fill routine, the microprocessor 44 then addresses the appropriate window memory 124 and stores a digital one in each of the memory locations for that window sensor. If the window is circular, a similar technique is used that employs a conventional algorithm to compute the addresses at the edge of the circle from its center address and radius. Once the edge addresses have been determined, a digital one is stored at each of the window memory addresses within the circle.

At the completion of the loading of the window memories 124, each of the images stored therein represents one of the four sensor windows for the vision input module. Specifically, each image memory has a one stored at each of the memory locations that correspond to the pixels over which the window is positioned. This creates a mask of the window in the memory 124. Because each window is stored in a separate image memory, the windows may overlap or coincide.

Then at step 210 control signals are sent to the video output selector switch 150 instructing it to chose the signals on line 118 from the input select circuit 116 and the output from one of the window memories 124 to generate the video output signal for monitor 13. This selection of signals within the vision input module creates a superimposed image of a binarized image from camera 11 and one of the sensor windows.

Once all of the components in the video processor section have been initially configured, the address generator 64 assumes control of the address bus multiplexor 60. This couples the address signal from the address generator 64 to the video processor address bus 45, except during the vertical retrace interval of the video signal. During this interval the CPU bus 43 is connected to the video processor bus 45 by the multiplexor 60. This enables the microprocessor 44 to access the video processor section components during the vertical retrace interval while the VIM displays a video image on monitor 13.

The start up routine at block 211 then tests two flag bits stored by the processor module 3 in the latch of the backplane interface circuit 52. The first bit indicates that the VIM has been taken off line so that setup of the sensor regions may occur. The other bit triggers the VIM to process an image. Assuming that the setup bit has been set, the graphics memory 122 is loaded with the start-up menu to be displayed on monitor 13 as denoted in block 212. This menu consists of alphanumeric information and an icon which ask the operator of the vision input module whether the module is to be placed into the setup mode. This display is created by microprocessor 44 sending control signals to the input select circuit 116 instructing it to connect the corresponding binary image output from processor 100 to the image output line 118. The graphics memory 122 is placed in the write mode and the menu image is generated and stored in the graphics memory.

Figure 12:
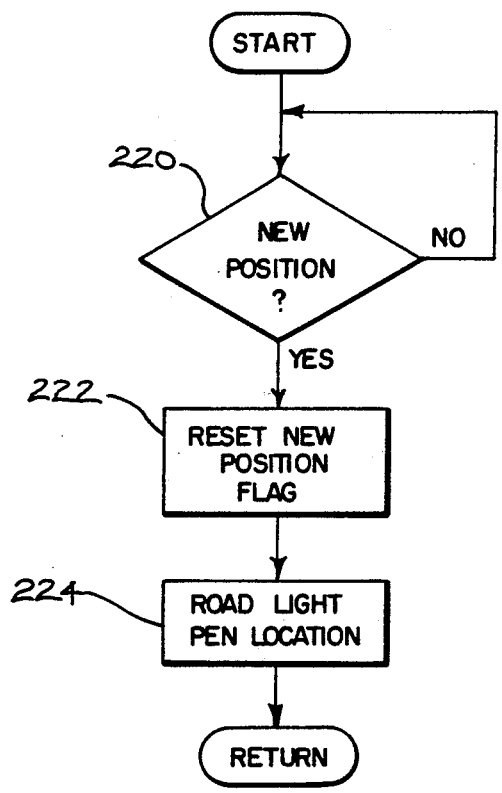
FIG. 12 is a flowchart of the software routine to sense input from the light pen of FIG. 1.

The start up routine then at process block 213 calls the light pen input routine shown in FIG. 12. At decision block 220, the microprocessor 44 accesses the light pen location register 160 and reads the latch flag bit which indicates whether the operator has activated the light pen 14. If the light pen has not been used, the program continues to loop through the decision block 220 waiting for the operator to use the light pen to indicate the mode of operation for the VIM. Once the flag indicates the activation of the light pen 14, the flag is reset at step 222. The light pen location stored in the register 160 is then read by the microprocessor 44 at step 224 and the light pen routine returns to its calling point on the FIG. 11 flow chart.

At decision block 214, the location at which the light pen touched the screen is compared to the address ranges for the displayed icon which indicate the set up mode. If the light pen 14 was activated at a location other than either of the two icons, the program at step 215 checks the setup flag bit. If the bit is still set, the program loops back to again call the light pen routine. If the bit has been reset by the processor module 3, the program returns to step 211 to test the setup and trigger flag bits. For the sake of the present explanation of a VIM operation, it is assumed that the setup mode was selected and the program advances to process block 216.

The setup mode allows the operator to redefine one or all of the sensors. For example, this mode is used to configure the VIM for a new workpiece. Prior to entering the setup phase, a workpiece is accurately positioned in front of the camera 11 at its datum position. The selection of the setup mode causes the VIM program to transfer to the setup routine represented by the flow chart in FIG. 13. The steps of the setup routine which require access to components in the video processor section are carried out during one or more vertical retrace intervals of the video synchronization signal for camera 11 and monitor 13. Initially, the window sensor pointer is set equal to one at step 230 so that the first window will be processed. At step 232, the input select circuit 116 shown in FIG. 3B is configured by the microprocessor 44 to transmit the first binarized image from the image processor 100 to the image output line 118. Data indicating the configuration of the select circuit is stored in RAM 48 so that it can be returned to this state after it has been temporarily changed so that microprocessor 44 can access the graphics or window memories 122 or 124. The video output selector 150 is then set at step 134 to create a superimposed image of the output from the image select circuit 116, the graphics memory 122 and the first window mask stored in window memory 124. This superimposed video image is then displayed on monitor 13.

During the next vertical retrace interval the main setup menu is stored in the graphics memory 122 for display. In order to display a new menu, the input select circuit is reconfigured to couple the data bus 41 to output line 118 at step 236. Then the menu data is copied from ROM 46 to the graphics memory 122 where it is stored at memory locations which correspond to the portion of the video image at which the menu is to appear. Once the menu is stored in the graphics memory 122 it will be displayed on the monitor 13 during the next video field. The input select circuit 116 is then returned to its previous configuration.

Figure 13:
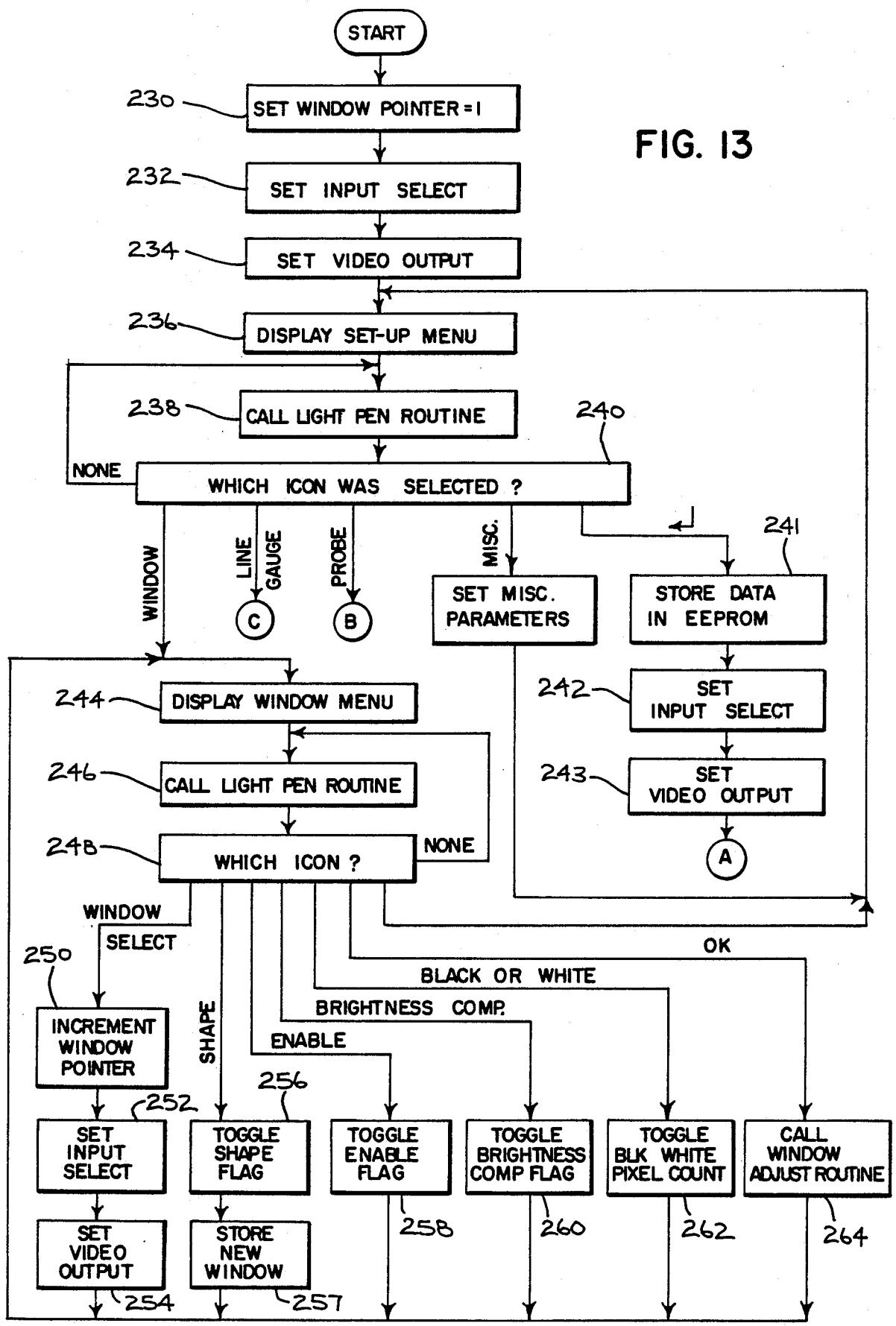
FIG. 13 is a flowchart showing the beginning of the sensor setup software routine, and the main portion of the sensor window setup, process.
Figure 14:
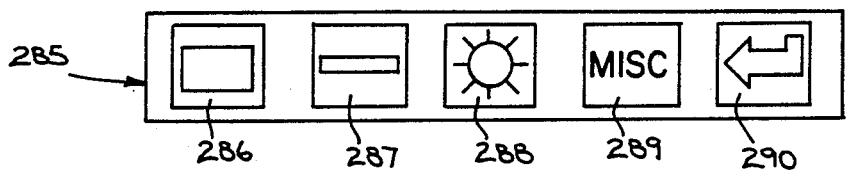
FIGS. 14, 15 and 16 illustrate the icons for the main setup menu, the main window menu and the window adjust menu, respectively.

With reference to FIG. 14, the menu consists of five icons 286–290 within a rectangular box 285. Icon 285 represents a window sensor, icon 287 depicts a line sensor and icon 288 represents the brightness probe. Icon 289 indicates miscellaneous functions and the return arrow icon 290 indicates the completion of the set up process. The program as flow charted on FIG. 13 then calls the light pen routine at step 238 to await the selection of one of the five icons by the operator. When one of the icons has been selected, the microprocessor 44 at decision block 240 determines which of the icons has been chosen. As previously described with respect to the start up routine, at this step the microprocessor 44 compares the location selected by the activation of the light pen with the range of addresses for each of the icons to determine which one was selected.

Figure 15:
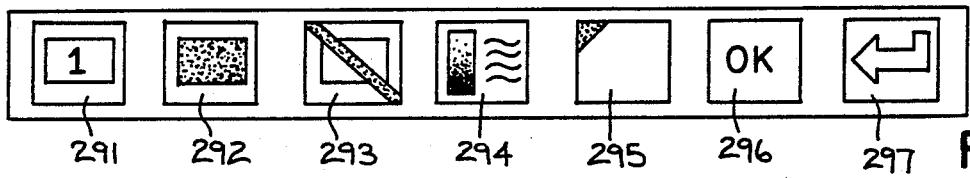

Assuming that the window icon 286 was selected, the program then enters a routine illustrated on FIG. 13 whereby the operator is afforded the opportunity to configure each of the four window sensor areas. In the next step 244, the main window configuration menu illustrated in FIG. 15 is displayed across the bottom of the monitor display. This is accomplished in the same general manner as the display of the setup menu described above. However, in creating the window menu shown in FIG. 15, microprocessor 44 examines the various configuration flags stored in the data table for the window designated by the window pointer. The various flags indicate the status of each of the parameters designated by the icons 292–295. The logic level of each flag is then used to select the appropriate icon image from RAM 46 for the menu. Each selected icon image is then stored at the respective location in the graphics memory 122 to form the menu display.

The window menu consists of seven icons. The first one 291 is used to select one of the four windows for configuration. The shape of the window may be changed by activating the light pen 14 over icon 292 to select either a rectangular window as shown in FIG. 15 or a circular window. Alternatively, a third option may be provided to allow the window to be defined by artwork placed in front of camera 11 for storage in the window memory. The next icon 293 enables and disables the image processing by the selected window. Icon 204 selects whether the brightness threshold for the binarized image used with the selected window will remain fixed or allow to vary according to the illumination changes sensed by the brightness probe. Icon 295 determines whether white or black pixels will be counted. Because the pixel counters 152 tabulate only white pixels, the black pixel count is obtained by a software routine which subtracts the white pixel count from the total number of pixels within the window. The selection of icon 296 steps the program to the window adjustment routine where the size and location of the window may be altered. The return arrow 297 causes the routine to return to the next higher level of the set-up process, in this case the main set-up menu.

Once the main window menu has been displayed, the light pen routine is called at step 246. When a selection has been made decision block 248 determines which of the seven icons has been chosen. If the window select icon 286 was picked, the window pointer address in RAM 48 is incremented to the next window at step 250. Then at step 252 control signals are sent by the microprocessor 44 to the input select circuit 116 so that the binarized image corresponding to the selected window are fed from binary image processor 100 to the image output line 118, and displayed on monitor 13. At step 254, the video output circuit 150 is sent control signals which cause it to couple the selected window image from the respective window memory 124 to the video monitor 13. Steps 252 and 254 create a superimposed image on monitor 13 consisting of the new window contained in memory 124, the binary image for the new sensor window and the menu stored in graphics memory 122. After step 254 the program returns to process block 242 where the main window menu for the next window is displayed. This is the same as the previous window menu except the window number in the first icon 291 designates the new window.

If the shape icon 292 is selected at step 248, the shape flag bit in the fourth word of the data table for the designated window (FIG. 9) is toggled to select the next shape at step 256. A window having the new shape is stored in the designated window memory 124 using default values for its location and size at step 257. The program then returns to step 242 where the main window menu shown in FIG. 15 is redisplayed with the new icon 311 for the window shape. If the enable icon 293, the brightness threshold compensation icon 294 or the black/white pixel count icon 295 is selected, the corresponding flag bit in the window data table is changed at steps 258, 260 or 262 respectively. If the OK icon 296 is chosen, step 264 calls the window adjustment routine shown in FIG. 17. The first step 270 of the window adjustment routine displays its menu across the bottom of monitor 13. This menu illustrated in FIG. 16 consists of six icons 320-325. The first icon 320 is selected if the operator wishes to reposition the window within the image. The second icon 321 is used to change the size of the window. Icon 322 selects whether the X and Y position of the window is allowed to float with shifts in the location of the workpiece 12 within the video image or is to remain fixed in place, anchored. Icon 324 allows the operator to change the range of acceptable pixel counts. And the return arrow 325 causes the window adjust routine to return to step 242 where the main window menu is again displayed.

Figure 17:
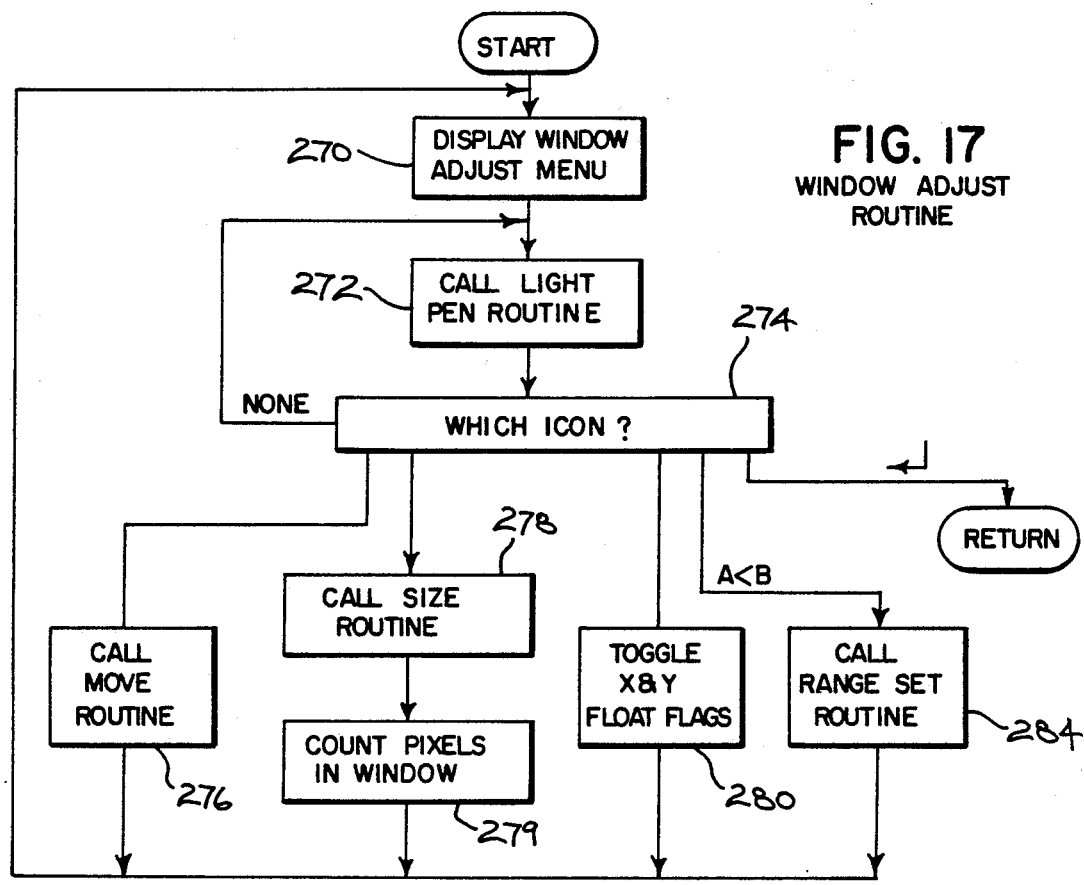
FIG. 17 is a flowchart of the window adjust software routine.

Once the window adjust menu has been displayed the routine transfers to step 272 in FIG. 17 where the light pen routine is called. When the activation of the light pen 14 is detected, the program transfers to decision step 274 where the particular icon that was selected is determined.

Figure 19:
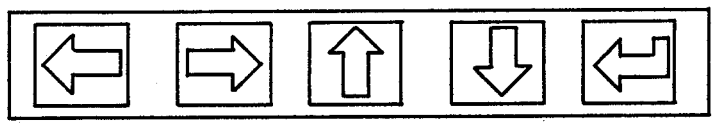
FIG. 19 illustrates the icons for the sensor move software routine menu.
Figure 18:
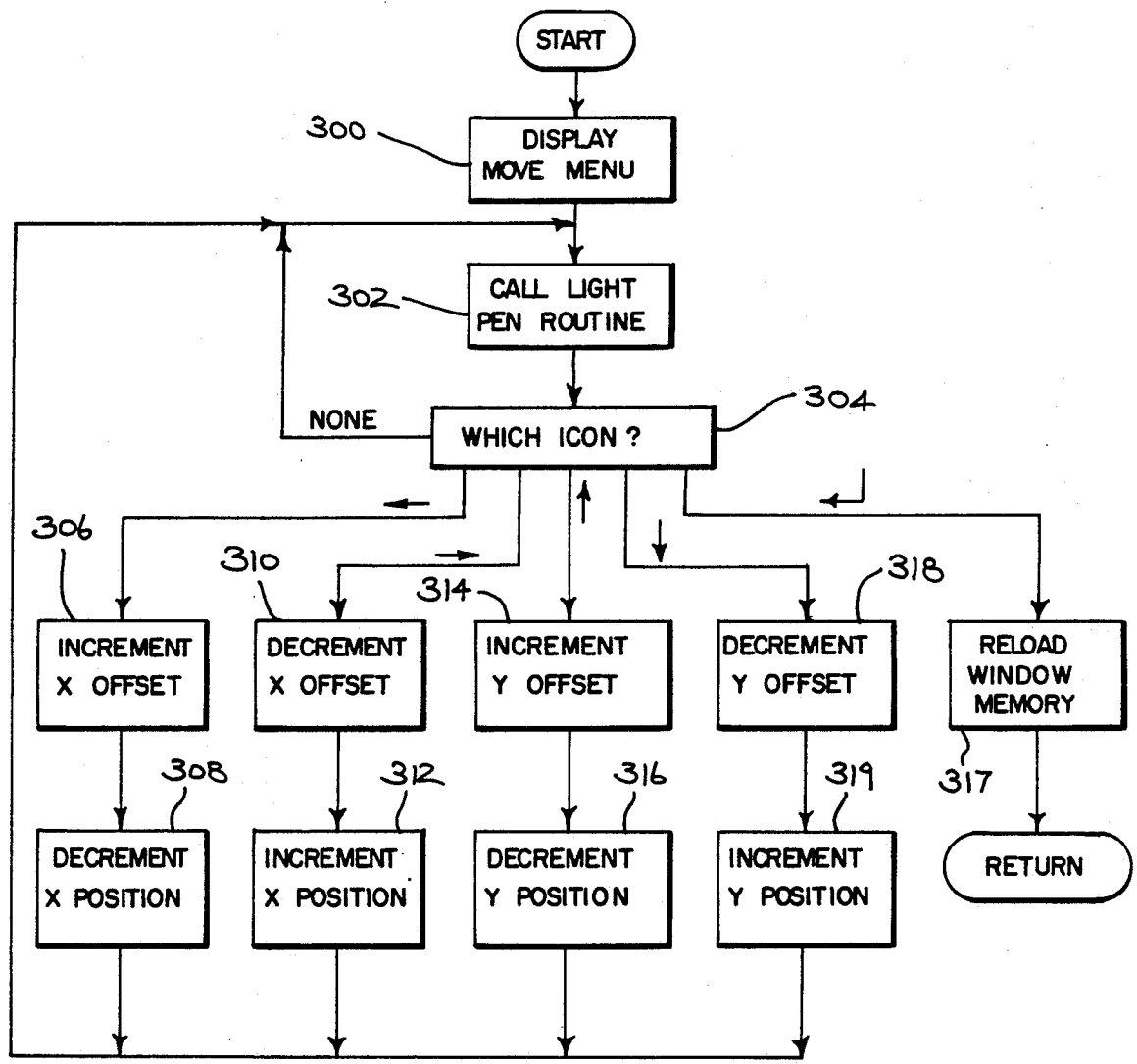
FIG. 18 is a flowchart of the sensor move software routine.

If icon 320 is selected indicating that the operator wishes to move the sensor window, the move routine shown in FIG. 18 is called at process block 276. At the first step 300 of this routine, the move menu illustrated in FIG. 19 is displayed. This menu consists of arrows indicating the direction in which the window is to be moved and the standard return arrow which is used at the completion of the repositioning. Once the menu has been displayed, the light pen routine is called at step 302. When the activation of light pen 14 is detected, the program transfers to step 304 where the selected icon is determined by comparing the light pen location to the range of addresses for each icon. If the left pointing arrow is selected, the contents of the X offset latch 132 in the X-Y offset circuit 126 is incremented in step 306. The effect of storing a larger number in the X offset latch 132 produces a shift of the image stored in the window memory 124 to the left on the screen of the monitor 13. The X-Y offset 126 is used to produce movement of the window because it is a much faster method than if the the window perimeter was recomputed and filled every time the light pen indicated a change. After the X offset has been incremented, the X position in the first word of the configuration data block for this window (FIG. 9) is decremented at step 308. If the window is rectangular, the X position of the lower right-hand corner is also decremented.

If the right-hand arrow icon is selected by the light pen 14, the X offset is decremented at step 310 and the X position bytes in the configuration data block are incremented at step 312. For the upward arrow, the Y offset is incremented at step 314 and the Y position bytes are decremented at step 316. Similarly, when the down arrow is selected the Y offset is decremented at step 318 and at process block 319 the Y position bytes are incremented. Once the window has been moved to its new position, the return arrow icon is selected. This transfers the program to step 317 where the image memory for this window in the window memory 124 is first zeroed. Then the microprocessor 44 uses the location parameters contained in the configuration data block for the window to reload the window in the memory 124 at its new location. This process step also zeroes the X and Y offset latches 132 and 140 in the X-Y offset circuit 126. The move routine then returns to the window adjust routine on FIG. 17 where the window adjust menu is again displayed in step 270.

Figure 16:
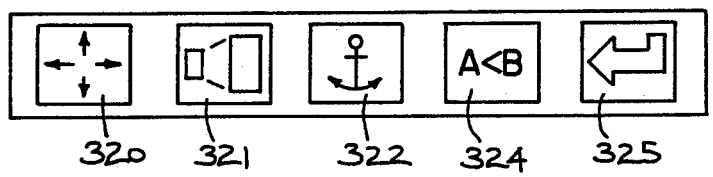

The window adjust routine also allows the size of the window to be varied by selecting icon 321 from the menu shown in FIG. 16 which causes the window adjust routine at point 278 to call the window size routine depicted in the flow chart of FIG. 20. At the first step 330 of the routine the flag bits in the window configuration data block that designate the geometric shape of the window are evaluated to determine whether or not it is circular. If the window is not circular, i.e., it is rectangular, the program transfers to step 332 where the window size menu is stored in graphics memory 122 and displayed on monitor 13. This menu is the same as that for the move routine and is shown in FIG. 19. The light pen routine is called at step 334.

When the light pen 14 has been activated, process block 336 determines which of the icons was selected. The selection of the arrows cause steps 338-341 to alter either the X or Y position of the bottom right corner of the rectangle. For example, the left arrow causes step 338 to decrement the X coordinate of the bottom corner in the configuration data block for that window. This has the net effect of moving the right edge of the window in one pixel location. At the completion of the selected step 138-141, the microprocessor 44 zeroes the window memory 124 and redraws the newly sized window as indicated by flow chart block 342. The program then returns to call the light pen routine again at step 334. When the alteration of the window is complete, the return arrow is selected which returns the program from the window size subroutine to step 279 of the adjust routine in FIG. 17. At this point the total number of pixels in the window are counted and the result is stored in the sixth word of the data table for the window. Thereafter the program returns to step 270 where the window adjust menu is redisplayed.

If at the beginning of the window size routine (step 330) of FIG. 20, the window was determined to be a circle, the program branches to step 350 where a different window size menu is displayed. This menu is similar to that shown in FIG. 19 but does not have any left or right arrows. At step 352, the light pen routine is called and when the light pen has been determined to be activated the program transfers to step 354. This step determines which of the arrows has been selected by the light pen 14. The change will be made by either increasing it or decreasing the radius, hence the need for only two arrows in order to change the size of the window. If the up arrow is selected step 356 increases the radius value stored in the configuration data block (FIG. 9) for the window, while selection of the down arrow causes step 358 to decrease the stored radius. At step 360 the microprocessor 44 then zeroes the corresponding window memory 124 and redraws the circular window using the new radius stored in the configuration data block. The program then returns to call the light pen routine so that additional changes in the size of the window can be made. Once the alteration of the circular window is complete, the return arrow icon is used to cause the program to return to the window adjust routine on FIG. 17 and execute steps 279 and 270.

In the window adjust routine, if the position float icon 322 is chosen, the X and Y float flag bits in the window's configuration data block are changed at step 280 to indicate that the position of the window is either to be fixed or allowed to float with shifts in the workpiece location.

Figure 22:
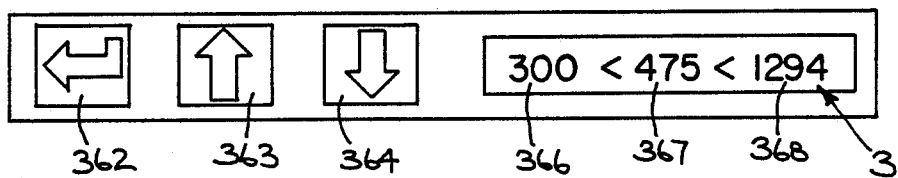
FIG. 22 illustrates the icon menu for the result range alarm setup software routine.

The minimum and maximum range alarm values can be set by selecting the corresponding icon 324 on the menu of FIG. 16. These maximum and minimum values establish a range of pixel counts which are used during the evaluation of the workpiece to determine if the actual number of pixels counted within the window is satisfactory. Section of icon 324 causes step 284 on FIG. 17 to call the range set routine shown in flow chart of FIG. 21. This routine begins at step 370 by displaying the range menu illustrated in FIG. 22. This menu contains a return arrow icon 362 and up and down arrows 363 and 364. The menu also contains a range numerical block 365 which displays the minimum value of the range 366, the maximum value of the range 368 and the value 367 that is currently being counted by the pixel counters in circuit 152.

Figure 21:
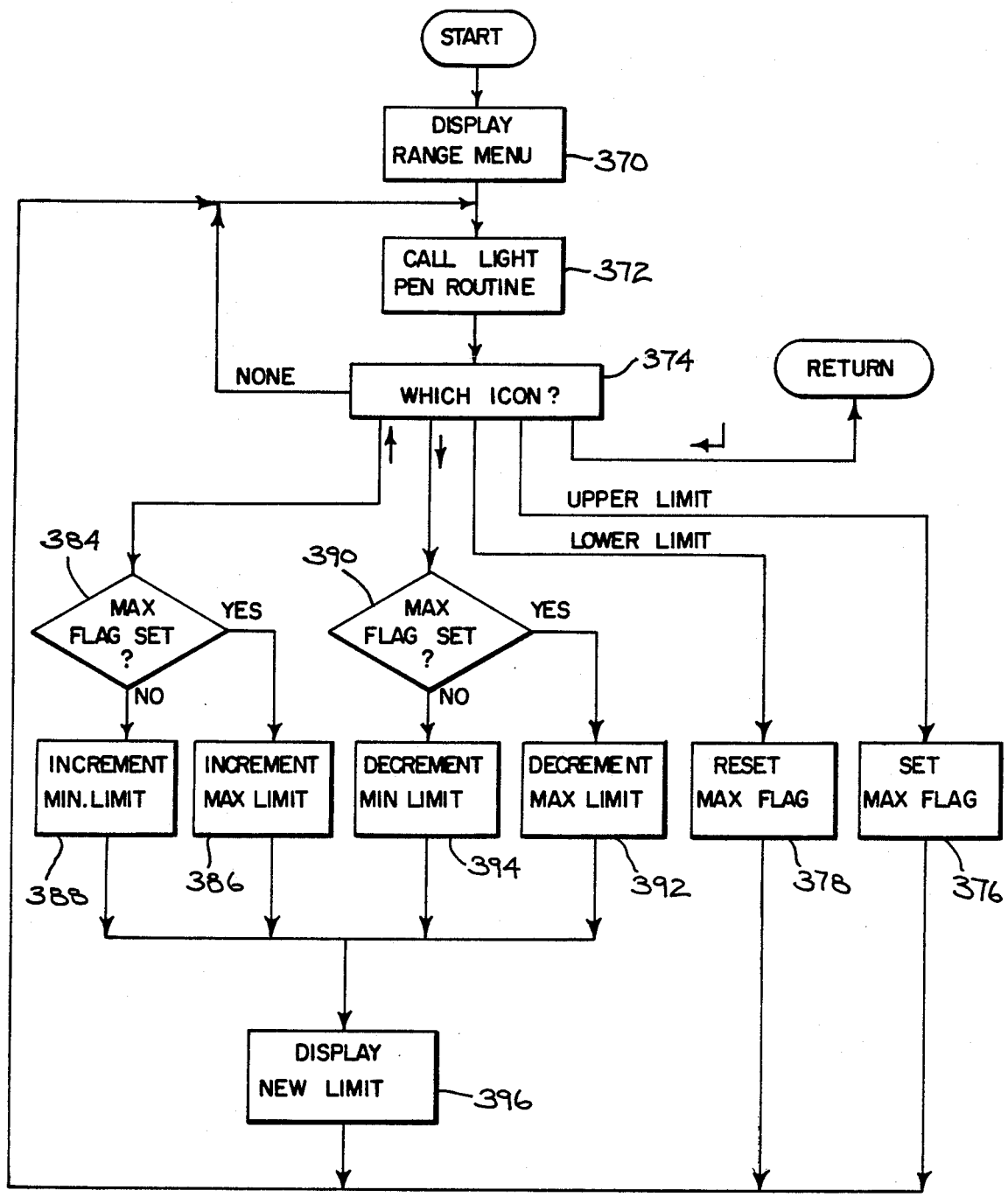
FIG. 21 is a flowchart of the sensor result range alarm setup software routine.

Step 372 of the flow chart in FIG. 21 calls the light pen routine. When activation of the light pen 14 has been detected, step 374 determines which of the icons has been selected. Initially either the minimum or maximum range limit numbers 366 or 368 will be chosen by the operator. If the maximum limit has been selected, step 376 sets a maximum flag in RAM 48. If the minimum limit has been picked by placing the light pen 14 over the numerical block 366, step 378 resets the maximum flag. The light pen routine is again called at step 374 to allow the operator to select one of the arrow icons 363 or 364. When the activation light pen has occurred, decision block 382 determines which of the two arrows was selected. If the up arrow was chosen, decision block 384 determines if the maximum flag is set. If indeed it is set, step 386 increments the maximum limit stored in the configuration data block (FIG. 9) for this window. If the maximum flag is not set at step 384, the minimum limit value in the data block is incremented at step 388. If step 382 determined that the down arrow icon 364 was picked, a determination is made if the maximum flag is set at decision block 390. If it is set, the maximum limit is decremented by the microprocessor 44 at step 392. If the maximum flag is not set, the minimum limit is decremented at step 394. After the incrementation or decrementation of the selected limit, a new numerical value for either the upper or lower limit is displayed at step 396 and a program returns to call the light pen routine at 372 to allow further incrementation or decrementation of the range limits. From step 372 selection of the return arrow icon 362 returns the program to step 270 of the window adjust routine (FIG. 17). Selecting the return arrow icon at point 272 on the window adjust menu returns to step 242 on the main window menu flow chart in FIG. 13.

Figure 23:
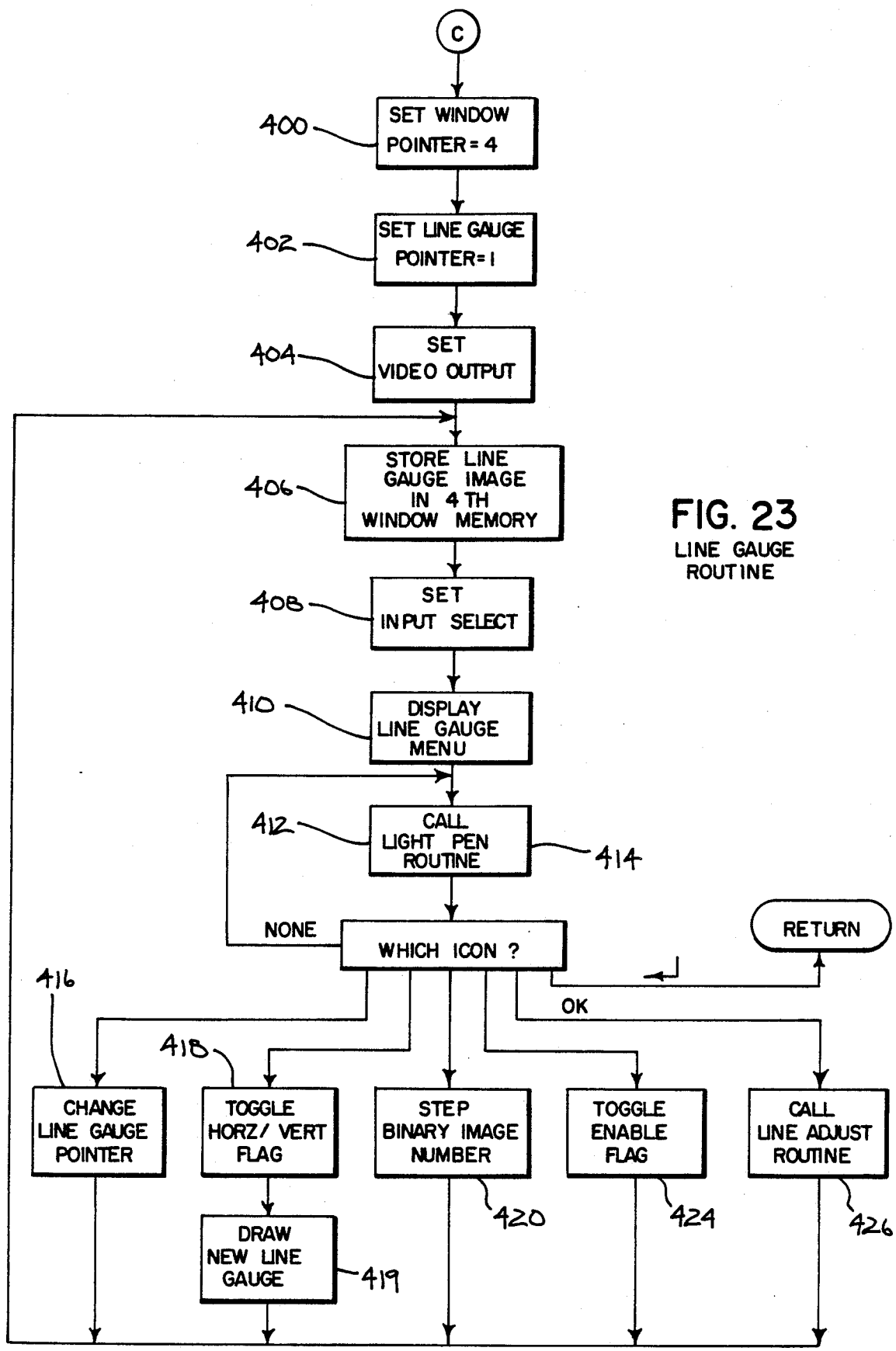
FIG. 23 is a flowchart of the line gauge setup software routine.

Referring again to FIG. 13, if the line gauge icon 287 in FIG. 14 is selected at step 238 the program transfers from decision block 240 to the line gauge routine represented by the flow chart of FIG. 23. As previously noted, the line guages are implemented in software unlike the sensor windows which are primarily implemented by hardware. As a result in order to display the line gauges on monitor 13, the microprocessor 44 utilizes the fourth one of the window memories 124 to create images of the line gauges for display purposes. To do this, the line gauge routine at step 400 sets the window pointer to the fourth window. At step 402, a memory address in RAM 48 designated as the line gauge pointer is set equal to one indicating the first line gauge. Next, the video output circuit 150 is set to create a composite image of the output from the image select circuit 116, the fourth window memory 124 and the graphics memory 122 at step 406.

Referring still to FIGS. 3A, 3B and 23, the microprocessor 44 then at step 406 draws an image the line gauge in the fourth one window memory 124. To do this, the microprocessor sends control signals to the input select circuit 116 to connect one of the lines of the data bus 41 to its image output line 118 which is coupled to the window memories 124. It then activates the fourth one of the window memories 124 and erases the old image data so that new data may be written into that memory. The microprocessor 44 utilizes the X and Y position information, the vertical/horizontal direction flag, and the length byte in the line gauge configuration data block (FIG. 10) to store an image of the line within the fourth window memory 124. Specifically, each of the memory locations representing pixel locations of the image over which the line gauge is positioned have digital ones stored in them and all the other locations contain a zero. This will create a white image on the display 13 representing the line gauge.

Then the input select circuit 116 is set to couple the binary image from processor 100 designated in the line gauge data block to the image output line 118 at step 408. The microprocessor 44 at step 410 displays the main line gauge menu illustrated in FIG. 24. This is accomplished as before by changing the input selection circuit 116 to connect one of the lines of the data bus 41 to the image output line 118 so that data may fed from the microprocessor to the input of the graphics memory 122 for storage therein. The main line gauge menu is then stored within the graphics memory 122 and the microprocessor 44 resets the image selection circuit 116 to its previous connection. The menu consists of six icons 430–435. The first icon 430 provides an indication of which of the six line gauges is currently being configured. Repeatedly selecting this icon with the light pen 14 steps the line gauge selection through each of the six gauges. The second icon 431 allows the operator to choose either a horizontal or a vertical line. The third icon 432 picks which one of the four binary images is to be used with the designated line gauge. Icon 433 allows the designated line gauge to be enabled or disabled. The OK icon 434 transfers the configuration program to the line adjust menu where the size, position and pixel functions of the line gauge are chosen. The return arrow icon 435 transfers the program from the line gauge routine back to the main setup routine at step 236.

Figure 24:
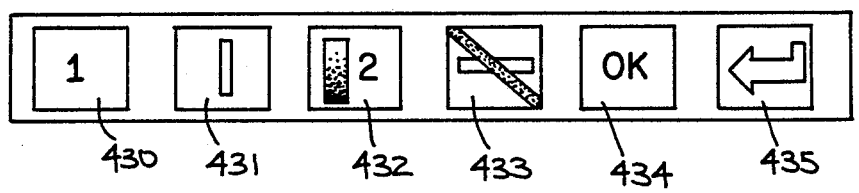
FIG. 24 illustrates the icon menu for the line gauge setup software routine.
Figure 25:
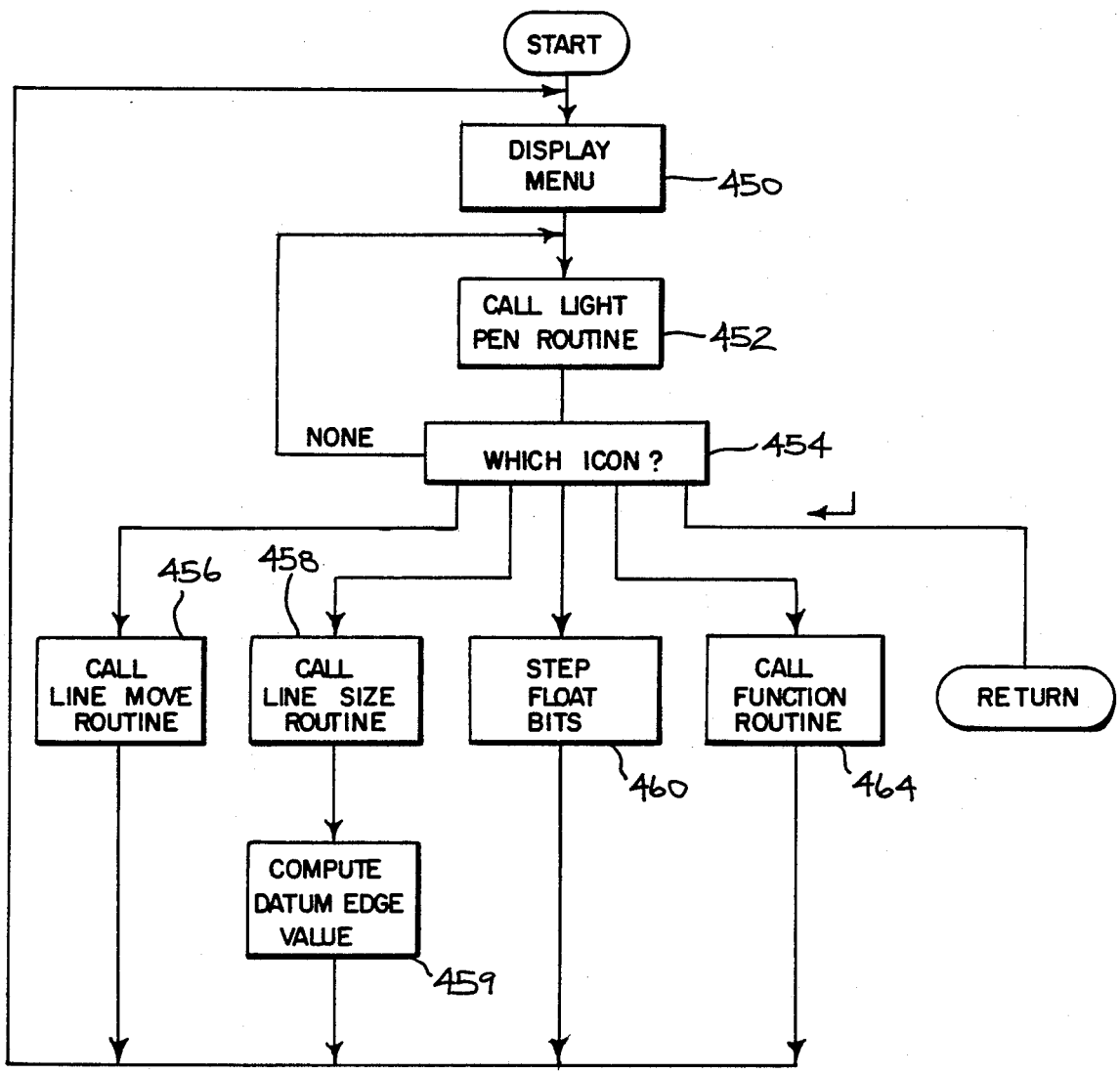
FIG. 25 is a flowchart of the line gauge adjust software routine.

When the activation of the light pen 14 is detected at step 412, the microprocessor 44 at decision block 414 determines which of the icons in FIG. 24 is selected. If the line gauge selection icon 430 is selected, step 416 increments the line gauge pointer to select the next one. If the last line gauge, number 6, was previously selected, the line designation will be changed at step 416 to number one. The program then returns to step 408 where the newly selected line gauge is loaded in the fourth window memory. If at step 414 the horizontal/vertical line select icon 431 is selected, the program transfers to step 418 where the horizontal/vertical flag in the designated line gauge data table is toggled to the other line orientation. Then at process block 419 a new line gauge is stored in the window memory 124 using default position and length values. If the binary image icon 432 is selected, the microprocessor 44 at step 420 increments the binary image number which is stored in the data table for the line gauge and changes the window pointer correspondingly. Selection of the enable icon 433 toggles the enable flag in the data table for the designated line gauge at step 424. If the OK icon 434 has been selected, the line adjust routine shown in FIG. 25 is called at step 426.

Figure 26:
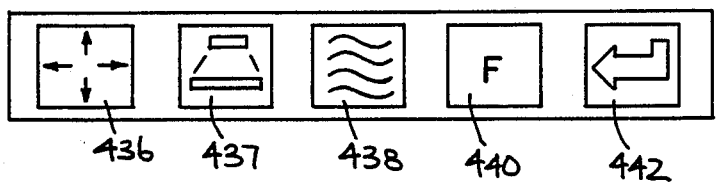
FIG. 26 illustrates the icon menu for the line gauge adjust software routine.

The line adjust routine allows the position and shape of the line gauge to be changed as well as to select the particular pixel evaluation function that will be performed. The first step 450 displays the line adjust menu that is illustrated in FIG. 26. This menu consists of six icons 436–442. The light pen routine is then called at step 452. Upon detection of an activation of the light pen, step 454 determines which of the icons was selected.

If the first icon 436 is selected, step 456 invokes a line move routine which is similar to the routine used to move the windows as previously described. Selecting icon 437 causes the program to call the line size routine at step 458. This routine also is similar to the one previously described to change the size of the window except that only the line's length is changed by the present routine. Selection of icon 438 invokes step 460 which sets the float function flag in the line gauge configuration data block. Repeated selection of icon 438 steps through the settings which designate if the line gauge position will float or not, or if the results of the line gauge are to be used as the source of the measurement of the workpiece's X or Y position.

Choosing icon 440 invokes step 464 which calls the function selection routine. This routine displays a menu on monitor 13 which allows the pixel evaluation function to be changed by stepping a selection icon through a set of numbers that correspond to the different evaluation functions. In addition, the range of acceptable result values may be changed in a similar manner to the way in which the sensor window pixel count ranges were set. By selecting the return arrow icon 442 the line adjust routine returns to the main line gauge in FIG. 23.

Figure 28:
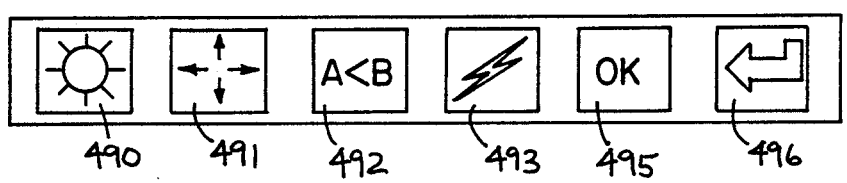
FIG. 28 illustrates the icon menu for the brightness probe setup software routine.
Figure 27:
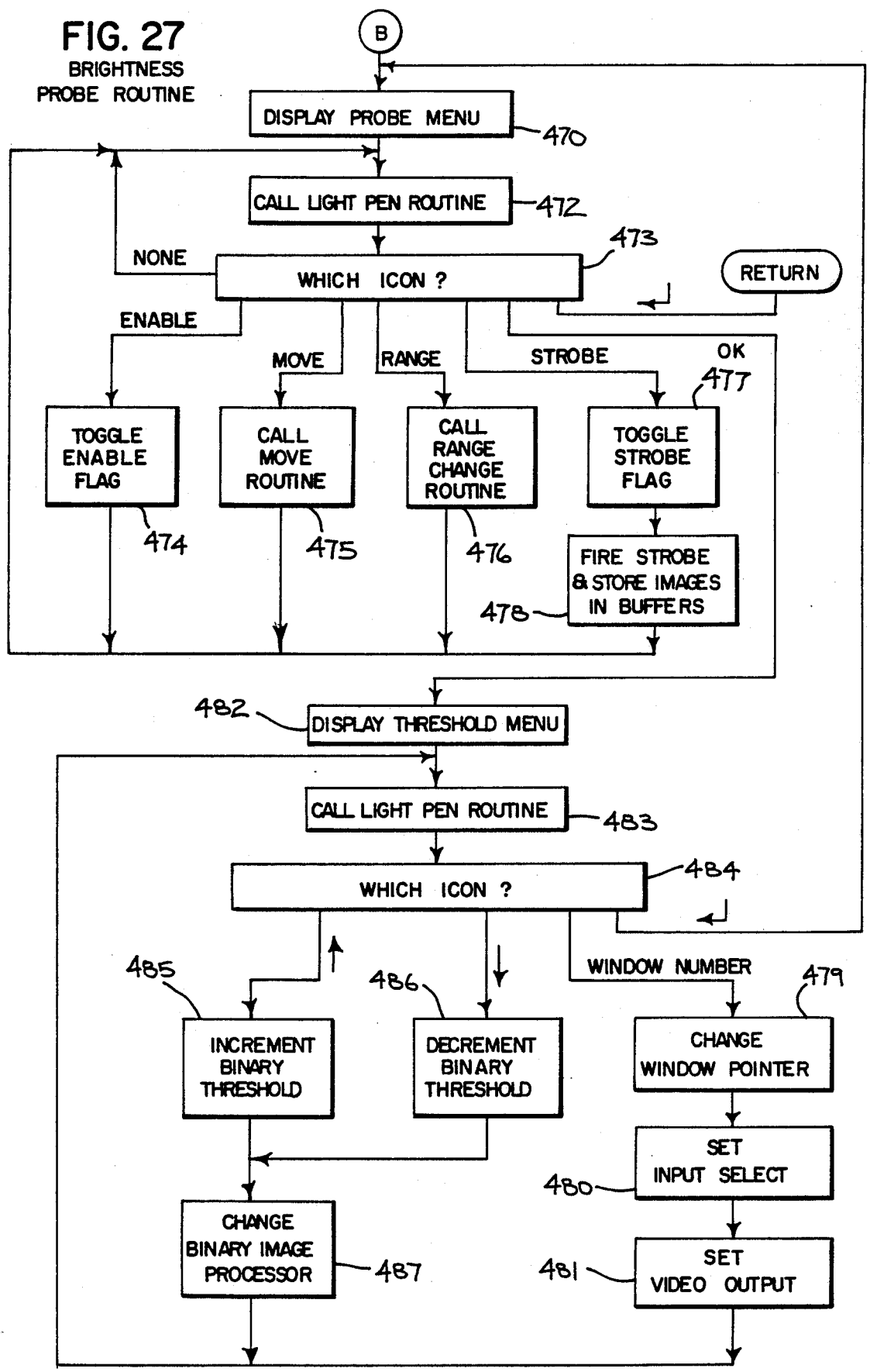
FIG. 27 is a flowchart of the brightness probe setup software routine.

Returning to FIG. 13 if at step 240 the brightness probe icon 288 in FIG. 14 was selected the program transfers to the routine in FIG. 27. The first step 470 displays the brightness probe menu illustrated in FIG. 28. This menu consists of seven icons 490–496. At the next step 472 the light pen routine is called. Once the light pen has been activated, the microprocessor 44 at step 473 determines which of the seven icons on the brightness probe menu has been selected.

Selection of the first icon 490 results in step 474 toggling the brightness probe enable flag in its configuration data block within RAM 48. The second icon 491 invokes the move routine at step 475 which is identical to the move routine for the sensor windows previously described. The program transfers to step 476 when the range select icon 492 is chosen thereby enabling the range of acceptable brightness values to be set. Icon 493 allows the use of a strobe light to be enabled or disabled. This is accomplished at step 477 by microprocessor 44 toggling the strobe enable flag at an address within RAM 48. Then the strobe light is fired to acquire a video image. The four binary images derived from the video image are stored in buffer memories 114. The input select circuit is changed to couple the buffer memory signals to its outputs.

Selection of the OK icon 495 transfers the program to step 482 where the binarization threshold menu is displayed by the microprocessor 44 at step 482. This menu presents icons which select one of the four thresholds of the binary image processor 100 and then increment or decrement that threshold value. This is accomplished by altering the binarization reference threshold byte in the fourth word of the configuration data block for the corresponding window. One icon is used to select a different one of the four binary images in order that its binarization threshold may be changed. Selection of this icon results in the microprocessor 44 incrementing the window pointer to the next window number at step 478. The microprocessor then at step 479 sends control signals to the input select circuit 116 so that the corresponding binary image from processor 100 is connected to the image output line 118 for display on monitor 13. Similarly the microprocessor sets the video output circuit 150 so that the selected window stored in memory 124 may be displayed along with the binary image at process block 480.

Up and down arrows in the menu cause the binarization threshold byte in the fourth word of the designated window's data block (FIG. 9) to be incremented or decremented thereby producing a brighter or darker picture on monitor 13. This is accomplished by calling the light pen routine at step 483 and allowing the operator via the light pen to select icons which either increase or decrease the threshold value of one of the binary images. If the icon is selected the microprocessor 44 increases the binary threshold value in the windows data table at step 485. Whereas if the down arrow icon is selected the threshold value is decreased at step 486. Each time that the threshold value has been changed, the microprocessor 44 tranfers that value from the window data table to the binary image processor 100 where it is stored in the threshold register for the corresponding image at process block 486. The program then returns to call the light pen routine again at step 483. When the threshold for the binary image has been properly adjusted a return arrow icon is selected which transfers the threshold setting routine back to the main probe display menu.

Returning to FIG. 13, the fourth icon 289 of the main setup menu illustrated in FIG. 14 allows miscellaneous functions to be configured. If this is selected decision step 240 tranfers the program to a routine that allows these parameters to be configured. One such parameter for example is whether the vision input module is to respond to a trigger signal from the processor module 3 or from an external source via the front panel terminals 17.

Once the user has completed his configuration of vision input module the return arrow icon 305 in the main set up menu is selected. At step 241 the microprocessor 44 tranfers the configuration data blocks for all of the sensors and other VIM configuration parameters into the EEPROM 54. This transfer updates the configuration data stored in the EEPROM so that should power fail or be turned off the current configuration has been archived. The processor module 3 can also request that the configuration data be transferred to it for additional backup storage in its memory. The input select circuit 116 is then sent control signals which cause it to connect the first image from the binary image processor 100 to its output line 118 at step 242. Next at step 243 the video output circuit 150 is configured to create a superimposed image of the output from the input select circuit 116 and the first window memory 124. At this point, the setup routine terminates and the program returns to step 211 on the flowchart of FIG. 11. The program continues to loop through the setup branch of the program until the processor module 3 resets the setup bit in the latch of the backplane interface circuit 52. When this occurs, the program waits at step 211 for either the setup bit to be set again or the video processing trigger signal. The trigger signal originates when the processor module 3 sets the trigger bit in the latch of interface circuit 52 or when an external device applies a trigger voltage to the designated one of the front panel terminals 17.

Image Processing

Figure 30:
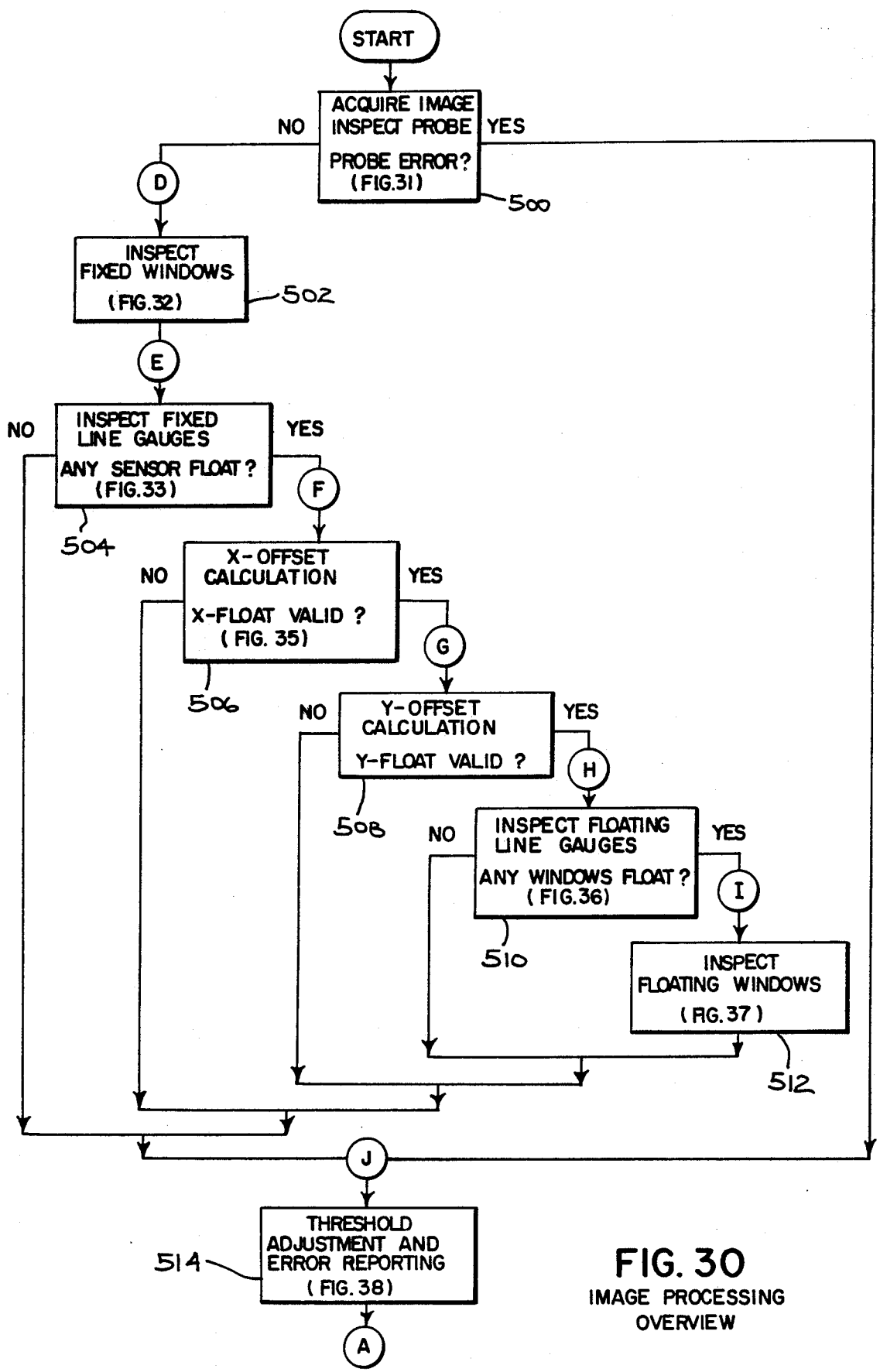
FIG. 30 is a flowchart representing an overview of the software for processing a video image.

Once the trigger signal is received, the program transers to the image processing routine. FIG. 30 presents an overview diagram of the image processing technique. At step 500, a video image is acquired and the luminance value measured by the brightness probe 26 is inspected. The luminance value must be within an acceptable range or the acquired image will be too dark or bright for proper processing. If the luminance is acceptable, the processing advances to step 502 where the pixel counts for each of the fixed windows are read and stored within the results data block in RAM 48. Next at stage 504, the fixed line gauges are inspected and the results of their analysis are stored in the results data block. If none of the windows or line gauges floats with changes in the position of the workpiece 12, the process transfers to the final step 514. If, however, some of sensors float, the process moves ahead to steps 506 and 508 where the workpiece position is measured and the amount of the X and Y position offsets are determined. Once both the X and Y offset calculations have been completed, the floating line gauges are analyzed and their results stored at step 510. Then the floating windows are analyzed at step 512 and the results stored in the results data block. Next at step 514, the luminance value from the brightness probe is used to adjust the threshold values in the binary image processor 100. Each of the individual sensor alarm bits is checked to determine the status for the master alarm bit. The remaining Figures of the drawings illustrate the flowcharts for each of the major steps in the image analysis process shown in FIG. 30.

Figure 31:
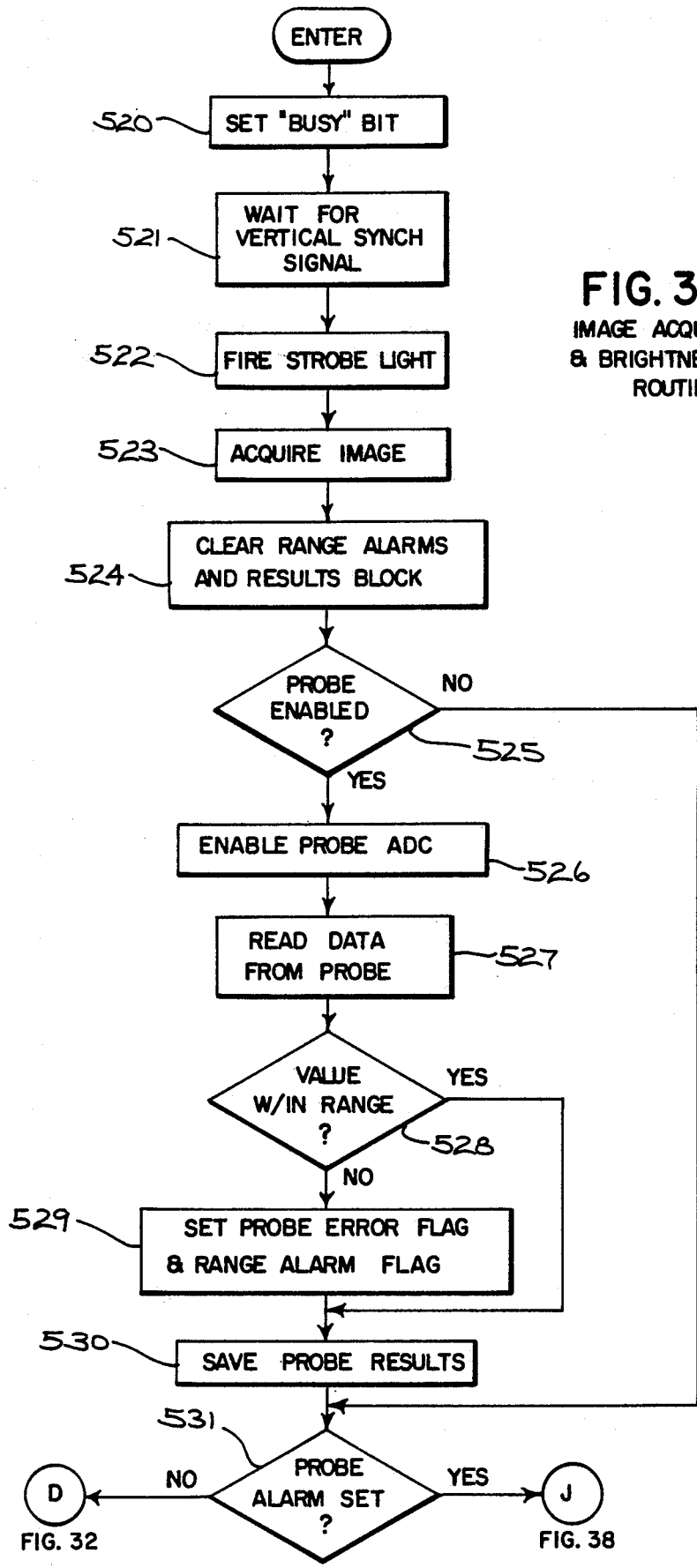
FIG. 31 is a flowchart of the program for acquiring a video image and analyzing the output from the brightness probe.

FIG. 31 is a flowchart of the video image acquisition and brightness probe inspection routine which will be described with reference to the schematic diagrams in FIGS. 3A and B. The routine begins at step 520 by setting the VIM busy bit in the output latch of the backplane interface circuit 52. The setting of this bit provides an indication to the processor module 3 that the VIM is actively evaluating an image and that the results are not yet available. The VIM then waits at process block 521 for a vertical sync signal from the address generator 64 which indicates the beginning of the next video frame. If necessary, the strobe light is fired at step 522 depending upon whether the enable bit is set in the configuration data block.

An image is then acquired at step 523. For this step the input select circuit 116 has been configured to connect the four output lines 112 from the binary image processor 100 to the input lines 120 of the pixel counters 152. In addition, the buffer memories 114 have been enabled to store each of the four binary images from the processor 100. At the completion of the image acquisition all of the storage locations for the range alarms and count values in the RAM results data block are cleared at step 524 to prepare them for the new values.

The brightness probe enable bit within the configuration data block is tested at step 525. If the probe 26 (FIG. 2) is not enabled the program transfers to step 531. If, however, the probe 26 is enabled, the analog-to-digital converter 90 (FIG. 4) within the brightness reference circuit 68 is enabled by a signal on the control bus 42 at process block 526. This couples the measured average luminance value onto the data bus 41. This data representing the average luminance value is then read by the microprocessor 44 at step 527. The luminance value is compared at step 528 to the range of acceptable luminance values stored within the configuration data block for the brightness probe. If the value is not within the acceptable range, a probe error flag within RAM 48 is set, as well as the range alarm flag for the brightness probe within the results data block shown in FIG. 29. The average luminance value sensed by the brightness probe 26 is then stored within the results data block at step 530.

Figure 32:
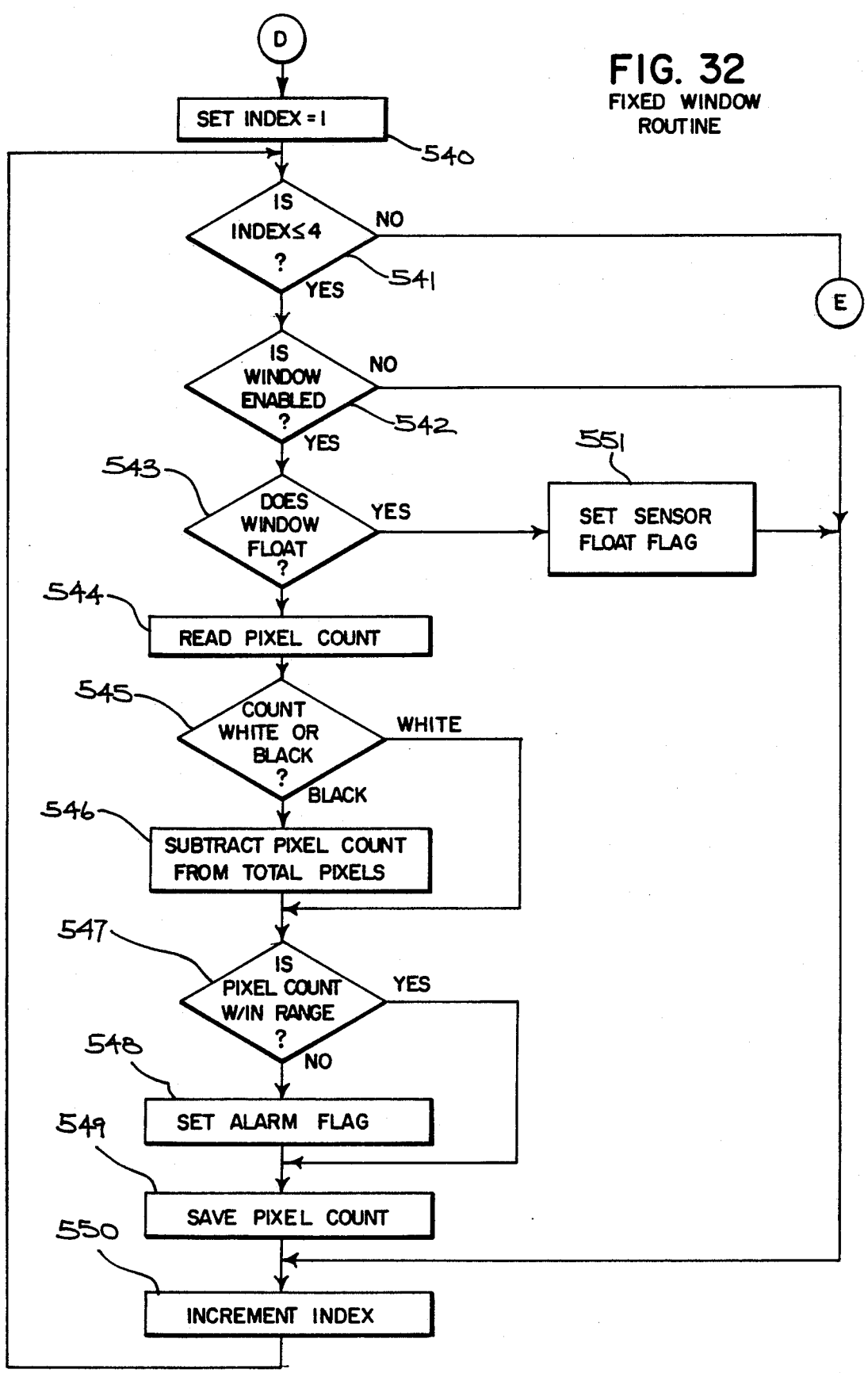
FIG. 32 is a flowchart of the routine to analyse the output from the fixed sensor windows.

The microprocessor 44 then tests the probe alarm flag to determine whether the lumination of the workpiece was within an acceptable range. If the alarm flag is set, the lumination of the workpiece 12 during the acquisition of the video image was either too dark or too bright in order to produce a satisfactory image for processing. If the alarm has been set, the program transfers to step 670 at the top of FIG. 38 bypassing all of the individual sensor analysis steps. Assuming, however, that the brightness probe alarm flag is not set, indicating that a satisfactory image has been acquired, the program will transfer to inspect the fixed sensor windows using the routine shown in FIG. 32.

This inspection routine commences at step 540 by setting a sensor index count value within RAM 48 to one. The program then enters the sensor window analysis loop wherein each of the four sensor windows is evaluated to determine whether their position is fixed and, if it is, the pixel count is read out. The analysis loop starts with decision block 541 where the sensor index count is checked to determine whether all of the four windows have been examined. If all the windows have not been examined, the program transfers to decision block 542 where the enable bit within the configuration data block for the window currently pointed to by the index count is examined to determine if the it is enabled. If the window is not enabled the program transfers to step 550 where the index count is incremented and the next window is examined. If, however, the window is enabled, the fixed window routine advances to step 543 where the float bit within the window's configuration data block is examined to determine whether the window position is fixed or floats. If the position is to float, a sensor float flag is set at process block 551 and the program execution advances directly to step 550.

However, if the position of the indexed window is fixed, the pixel count stored in the corresponding pixel counter 152 is read by the microprocessor 44 at process step 544. The configuration bit which designates whether the black or white pixels within the window are to be counted is then examined at decision block 545. As noted previously, the pixel counters 152 tabulate only the white pixels within the sensor window area. Therefore, if the black pixels are to be tabulated, the count of the white pixels from the pixel counter 152 must be subtracted from the total number of pixels within the window by the microprocessor 44 at arithmetic step 546. A determination is then made at decision block 547 as to whether the resultant pixel count is within the range of acceptable values that were defined by the operator for this window during the setup process. This determination is made by the microprocessor 44 comparing the count to the minimum and maximum limits of the range stored in the window's data block. If the pixel count is outside this predetermined range, the results data block alarm flag for this window is set at step 548. The pixel count is then saved within the results data block at step 549. The sensor index counter is then incremented at step 550 and the program returns to step 541 to inspect the results of the next sensor window. Once all four of the windows have been examined, the execution of the program will transfer from step 541 to inspect the results of the fixed line gauges.

Figure 33:
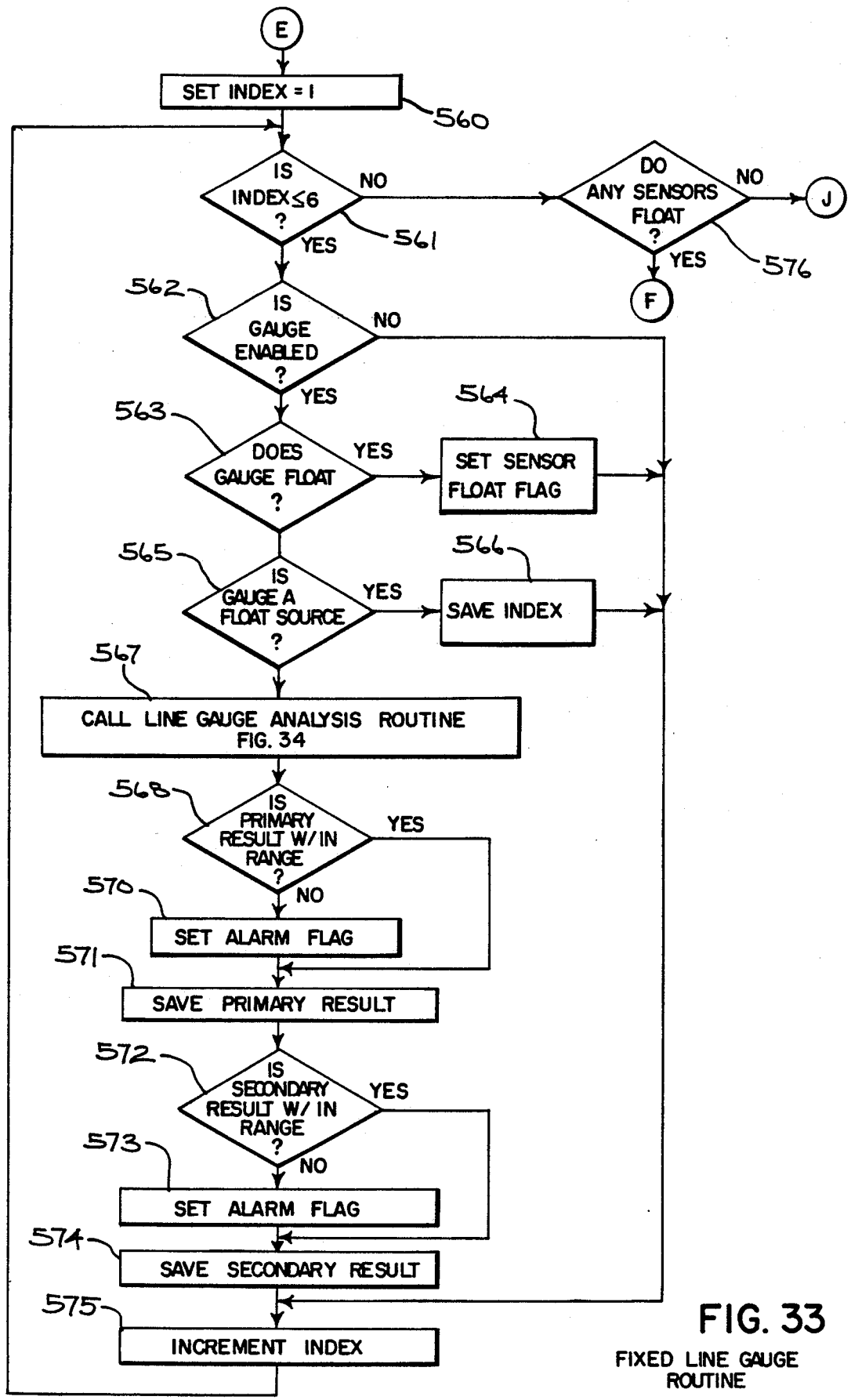
FIG. 33 is a flowchart of the program to analyze the output from the fixed line gauges.

The fixed line gauge analysis routine is shown in FIG. 33. Initially, at step 559, the address bus multiplexor 60 is configured to connect the CPU address bus 43 to the video processor address bus 45. Then the microprocessor 44 configures the output select circuit 148 so that the output signals from the buffer memory 114 are connected to the data bus 41. The sensor index count in RAM 48 is then reset to one at step 560 and the examination loop for each of the line gauges is entered. At the first step 561 of the examination loop, the index count is tested to determine whether all six of the line gauges have been examined. If the line gauge remains to be investigated, the program advances to decision block 562 where the enable bit contained in the configuration data block for the indexed line gauge is examined. If the gauge is not enabled, the program advances directly to step 575 where the index count is incremented so that the next line gauge may be examined. If, however, the line gauge is found to be enabled at step 562, an examination is then conducted of the line gauge's float bit within its configuration data block at step 563. If the gauge is to float, the sensor float flag is set at step 564.

Assuming that the line gauge is to remain fixed, a determination is made at step 565 of whether the analysis of this line gauge is to be used at the source of the float data for updating the X or Y offset register 126. If this is one of the sources of the float data, the number of the line gauge is then saved in a portion of RAM 48 designated for that purpose at step 566 and the program advances to step 575. If, however, a determination is made at step 565 that the line gauge is not a source of the float data, the line gauge analysis subroutine is called at step 567.

Figure 34:
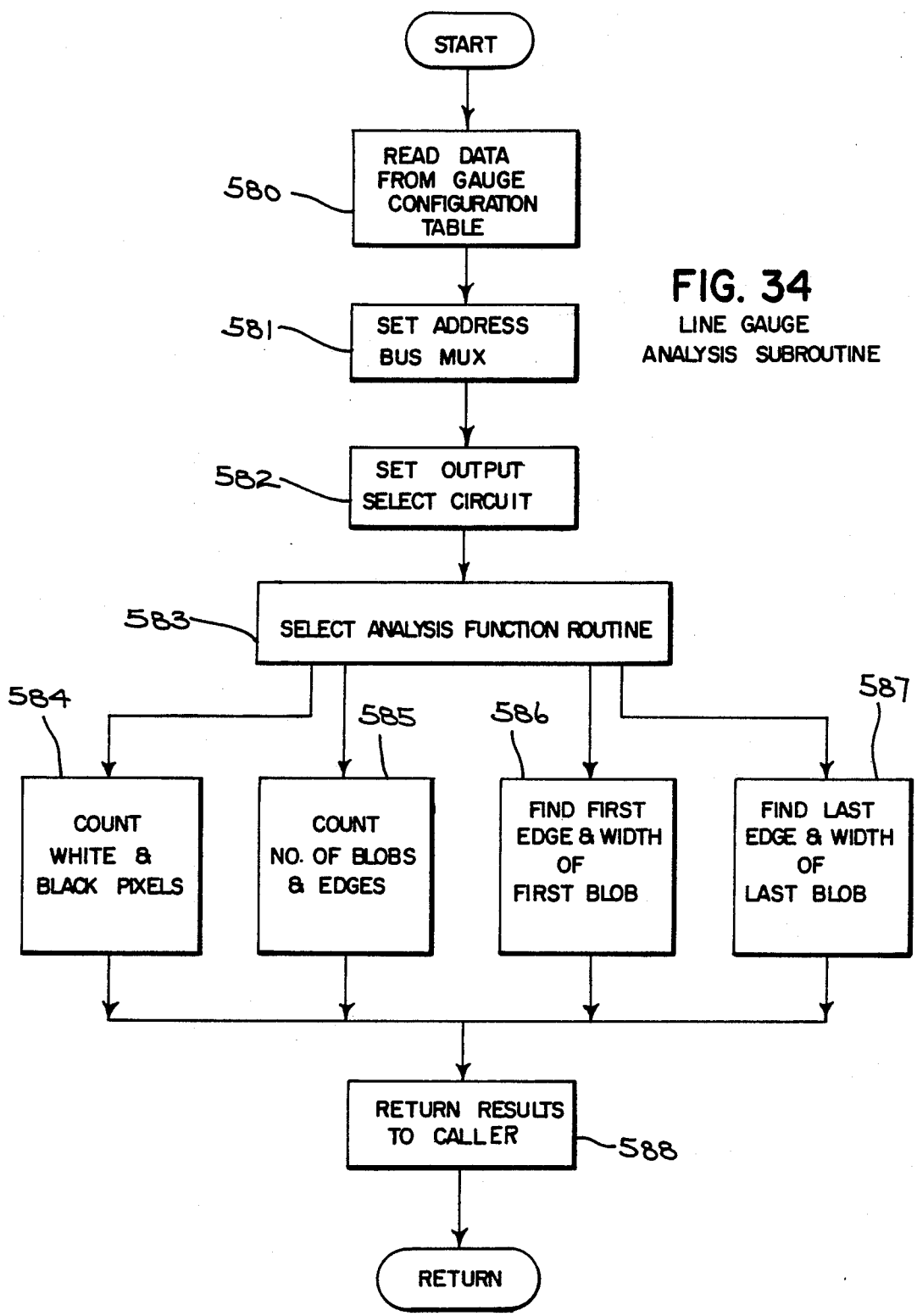
FIG. 34 is a flowchart of the subroutine to analyze the portion of the image defined by each of the line gauges.

The line gauge analysis subroutine, shown in FIG. 34, initially accesses the gauge's configuration data block at step 580 to read the data indicating the line direction, which color pixels are to be processed and the pixel analysis function which has been selected. A control signal is then sent to the address bus multiplexor 60 instructing it to couple the CPU address bus 43 to the video processor address bus 45 at step 581. The binary image for this line gauge has been stored within one of the buffer memories 114 and is accessed by instructing the output select circuit 148 to couple the buffer memory outputs to the data bus 41 at step 582.

The selected function then determines at step 583 which of the various processing branches 584-587 is to be executed. The first branch 584 counts the white and black pixels along the line gauge. Each of the pixels of this image along the line gauge is then addressed by microprocessor 44 and the white and black pixels are counted separately. The counts are retained in a temporary storage area of RAM 48.

The second branch 585 counts the number of pixel blobs and their edges which occur along the line gauge. A blob is defined as one or a group of contiguous pixels of the same color. In this portion of the routine the microprocessor 44 examines each of the pixels in the corresponding image stored within buffer memory 114. When a transition from a white to black or a black to white pixel is found the corresponding counts stored within RAM 48 are incremented. This branch of the function analysis routine is the used to count white on black blobs with the function number stored within the line gauge's configuration data block determining whether white or black blobs are to be counted.

The next branch 586 finds the first edge and the width of the first white or black blob going from left to right or top to bottom in the image. Whether a white or black blob is sensed is determined by the function number stored the line gauge configuration data block. This branch of the line gauge analysis routine would be used for each of the line gauges 23 and 24 which detect the edges of the workpiece 12 in the exemplary image shown in FIG. 2. In both cases the edge of the first white blob represents the edge of the workpiece 12. In the case of the horizontal line gauge 24, the processing commences by the microprocessor 44 addressing the pixel within the buffer image which is at the beginning, the leftmost end, of the line gauge. The microprocessor 44 then increments the pixel addresses for the buffer memory 114 and counts each successive black pixel until a white pixel is found. The number of pixel locations to the first white pixel determines the location of the edge of the workpiece 12. The white pixels are then counted until the next black pixel is found or until the end of the line gauge occurs. The number of white pixels counted determines the width of the first blob. A similar technique is used to locate the upper edge of the workpiece 12 using the vertical line gauge 23. In this case, however, the microprocessor 44 increments the pixel line count contained in the upper byte of the pixel address to locate the horizontal edge of the workpiece 12.

The last function analysis routine branch 587 finds the last edge and width of the last blob along the line gauge. For example, this branch would be employed if the horizontal line gauge 24 in FIG. 2 was located at the right edge of the workpiece 12, or if the vertical line gauge 23 was located over the bottom edge of the workpiece. The processing of the image in this branch 587 is similar to that of the previous branch 587 except that the microprocessor starts by addressing the last pixel along the line (the rightmost or bottommost one). Then the pixel column or pixel line address, depending upon whether the line gauge is horizontal or vertical respectively, is decremented to locate the edge of the blob and determine it's width.

Once the execution of the selected function branch 584-587 has been completed, the primary and secondary line gauge analysis results are returned to the calling point on the main program at step 588. For example, the primary result may be the white pixel count and the secondary result is the black pixel count. The line gauge analysis subroutine then returns to the point on the main program where it was called.

Returning to the fixed line gauge routine shown in FIG. 33, when the line gauge analysis routine returns, the primary result is compared to the range of acceptable values at decision block 568. If the result is outside of the predetermined range, the alarm flag for the line gauge is set in the results data block (FIG. 29) at step 570. The value of the primary function result is then stored in the results data block at step 571. Next, the secondary result of the line gauge analysis is compared to its range of acceptable values at decision block 572. If this secondary result is outside the predetermined range, the line gauge alarm flag is set at step 573. The value of the secondary result is then stored in its word in the results data block at step 574.

The sensor index count is then incremented at step 575 and the program returns to step 561 where the new index count is evaluated to determine whether all of the line gauges have been analyzed. When all of the line gauges have been analyzed, the program transfers to decision block 576 where the sensor float flag set in RAM 48 at steps 551 or 564 is checked to see if any of the windows or line gauges have been configured to float. If none of the sensors floats, the program execution jumps to step 670 on the flowchart of FIG. 38. However, if the sensor float flag is set indicating that at least one sensor floats with shifts in the position of the workpiece 12, the program transfers to the X offset calculation routine.

Figure 35:
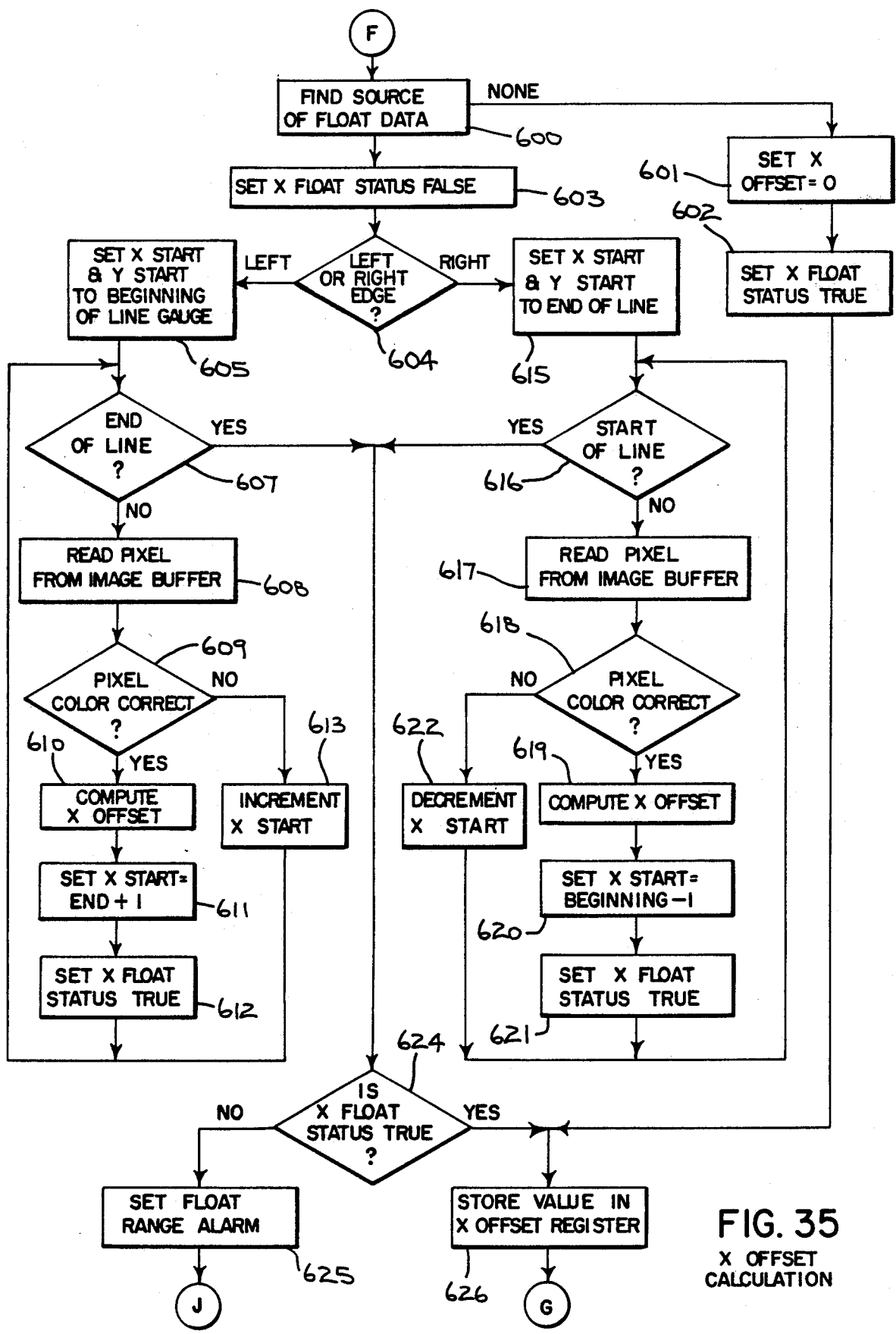
FIG. 35 is a flowchart of a routine to calculate the offset for the sensors in the X direction to compensate for horizontal shifts of the workpiece.

The X offset calculation routine shown in FIG. 35 commences by locating the line gauge which is to serve as the source of the float data. This is accomplished at step 600 by obtaining the index of the X float line gauge that was stored in RAM 48 at step 566 in FIG. 33. If an X float line gauge was not designated at step 566, the program sets the X offset value to zero at block 601. Then, an X float status flag in RAM 48 is set true at step 602 and the program advances directly to step 626.

If, however, a source line gauge for the X float data is found at step 600, the X float status flag in RAM 48 is set false at step 603. The function bits within the line gauge configuration data block are examined at step 604 to determine whether the location of the edge is to be measured from the left end or right end of the line gauge. That is, whether the edge of the first or last blob respectively is to be detected. These function bits also designate the blob's color.

If the measurement is to be made from the left end of the sensor, as it would for line gauge 24 in FIG. 2, pixel location variables XSTART and YSTART are set equal to the pixel column and pixel line address bytes respectively for the beginning of the line gauge, at process block 605. The value of XSTART is then compared to the X coordinate for the end of the horizontal line gauge at decision block 607. If the value XSTART is not beyond the end of the line, the pixel at the address represented by XSTART and YSTART is read from the designated image buffer 114 at step 608. The microprocessor 44 then analyzes whether the color of the current pixel is the same as that for the blob which is to be detected, at decision block 609. If the pixel is not the correct color indicating that the edge of the workpiece 12 has not been reached, the value of XSTART is incremented at step 613 and the program returns to decision step 607 to examine another pixel. If, however, the pixel is determined to be the correct color at step 609, indicating that the edge of the workpiece 12 has been detected, the X offset is computed at process block 610 by subtracting the datum location byte in the line gauge configuration data block from the value of XSTART. If the workpiece has not shifted along the X axis the computed offset will be zero as XSTART will have the same value as the datum location. The sign of the offset determines the direction of the shift from the datum location. XSTART is then set equal to the end of the line plus one at step 611 and the X float status flag is set true at step 612. The program then returns to the end of line decision block 607 where, since the value of XSTART is now beyond the end of the line, the program transfers to decision block 624.

Continuing to refer to FIG. 35, a similar section of the X offset calculation routine is executed if the edge of the workpiece is to be measured from the right end of the horizontal line gauge. If this is the case, the program advances from step 604 to step 615 where the values of XSTART and YSTART are set equal to the coordinates of the end of the line gauge. At step 616 the microprocessor 44 determines whether the XSTART value is less than the X coordinate for the beginning of the line gauge. If XSTART is not less than the beginning of the line. The values of XSTART and YSTART are used to address a pixel in the corresponding buffer memory 114 at step 617. The microprocessor 44 then evaluates the color of the pixel to determine whether it has the same color as the blob that is to be detected. If the color is not the same, indicating that the edge of the workpiece 12 has not been encountered, the value of XSTART is decremented at step 622 and the program returns to step 616 to evaluate the next pixel.

If, however, the pixel is the proper color, the X offset is computed by subtracting the datum location byte from the value of XSTART at step 619. XSTART is then set equal to the beginning of the line minus one at step 620 and the X float status flag is set true at process block 621. The execution then returns to decision block 616. At this point since the value of XSTART is less than the X coordinate at the beginning of the line, the program advances to decision block 624.

The X float status flag is then examined. If the status flag is false, indicating that the edge of the workpiece was not found, the float range alarm flag is set and the program transfers t step 670 in FIG. 38. If the float status value is true, the value of the computed X offset is then stored in the offset register 126 at step 626.

Figure 36:
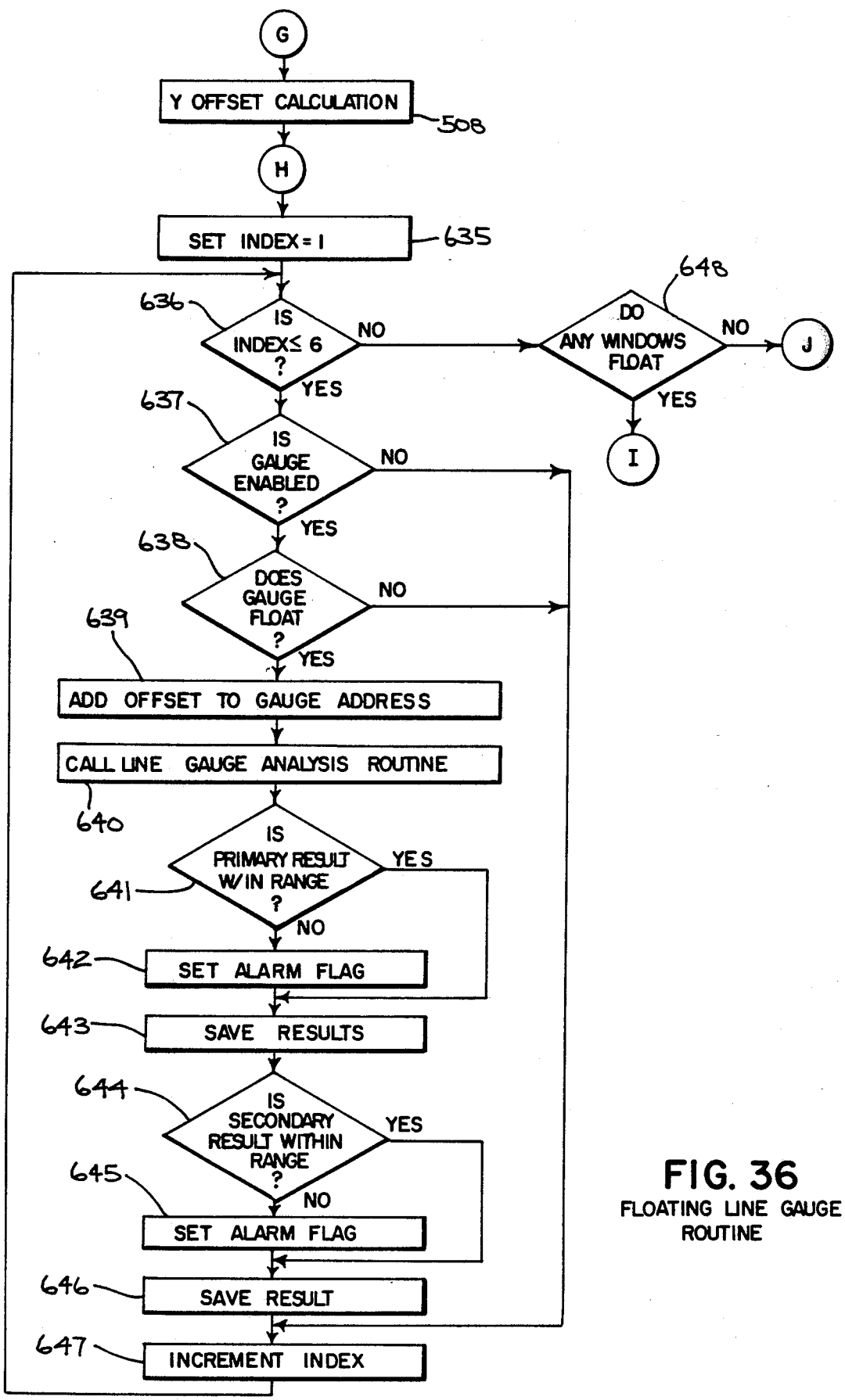
FIG. 36 is a flowchart of the program to analyze the portion of the video image defined by a floating line gauge.

The program then transfers to a routine, designated by step 508 on FIG. 36 which calculates the Y offset. This routine is similar to that shown for the X offset calculation except that the value of YSTART instead of XSTART is either incremented or decremented depending upon whether the measurement is to occur from the top or the bottom of the line gauge respectively. After the Y offset calculation has occurred, the program transfers to node H at the start of the routine to inspect the floating line gauges.

The floating line gauge analysis routine commences at step 635 on the flow chart in FIG. 36 where the sensor index count in RAM 48 is set to one. As with previous routines, this index count is used to sequentially evaluate each of the six sensor line gauges. The index count is then evaluated at decision block 636 to determine if it is pointing to one of the six line gauges. If the index count still has a value less than or equal to six, the designated line gauge configuration data block is inspected at step 637 to determine if that line gauge is enabled. If the line gauge is not enabled, the program advances directly to step 647 where the index count is incremented to the next line gauge number. However, if the line gauge is enabled the position float flag within its configuration data block is evaluated at decision block 638. If the designated line gauge does not float, the program jumps to step 647 to increment the index counter for the next line gauge.

If the line gauge pointed to by the index count does float, microprocessor 44 adds the X and Y offset values to the pixel columns and line bytes respectively of the address for the pixel at the origin of the line gauge. The coordinate for the end of the line gauge is also adjusted. The line gauge analysis routine shown in FIG. 34 is then called at process block 640 to perform the function designated in the configuration data block for this line gauge. As noted previously, each line gauge analysis function returns two results. For example, the two results may be the count of the black and the white pixels along the length of the line gauge.

The primary result is evaluated to determine if it lies within the range of acceptable values at decision block 641. If the primary result is not within its predefined range, the alarm flag for the designated line gauge is set at step 642. The primary results are then saved within the area of the results data block of RAM 48 (FIG. 29) that has been designated for these results. Next, at step 644 the secondary result is inspected to determine if it lies within its predetermined range of acceptable values. If the secondary result is outside of its range, the alarm flag for the line gauge is set at step 645. The secondary result is then stored at step 646 in the corresponding word of the results data block. After the results have been saved, the index count is incremented at step 647 and the program returns to step 636 where the next line gauge is processed.

If the index count has been incremented to a number greater than the number of line gauges (e.g. six), a branch in the program occurs from decision block 636 to step 648. At this step a determination is made as to whether any of the sensor windows float. If none of the windows floats, the program transfers to step 670 in the flow chart shown in FIG. 38, bypassing the inspection routine for the floating windows. If, however, one or more of the sensors windows is configured to float, the program advances from decision block 648 to the floating window analysis routine.

Figure 37:
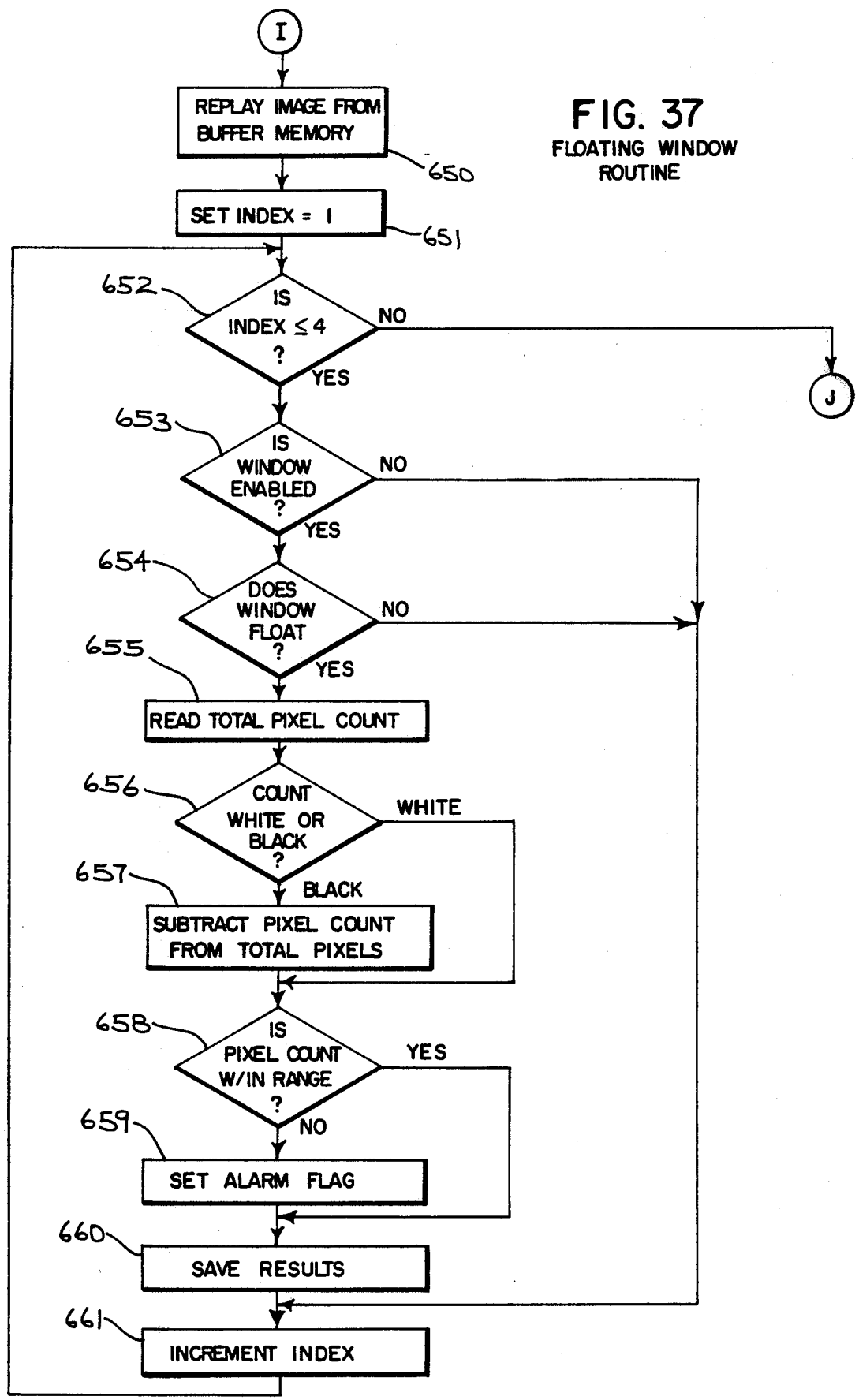
FIG. 37 is a flowchart of the program to analyze the portion of the video image defined by floating window sensors.

With continuing reference to FIGS. 3A and B, the analysis of the floating windows commences at step 650 in FIG. 37 with a simultaneous replay of each of the four binary images that have been stored in the buffer memories 114. At the outset of the replay, control signals are sent to the input select circuit 116 to connect the output from the buffer memory 114 to the pixel counters 152. The address bus multiplexor 60 is also engaged to couple the address signal from generator 64 to the video processor address bus 45. Once the replay has been completed the sensor index count in RAM 48 initialized to one at step 651.

Then an inspection is made of the pixel counts for the windows that float. This is accomplished by initially testing whether the index count is a valid window number at step 652. As long as the index count is still pointing to one of the four windows, a determination will be made at step 653 as to whether or not the window is enabled. If the enable flag within the window's configuration data block is not set, the program will advance directly to step 661 where the index count is incremented and the next window will be evaluated. If, however, the present window is enabled, a determination is made at step 654 as to whether the position float flag bit within the configuration data block has been set for this window. If the bit indicates that the window is to float, the total number of pixels within the window is read from the configuration data block at process block 655.

A determination is then made as to whether the white or black pixels are to be counted for this sensor window at decision block 656. If black pixels are to be counted, the number of white pixels contained within the pixel counter 152 is subtracted from the total number of pixels within the window in arithmetic step 657. The white or black pixel count is then evaluated at step 658 to determine if it is within the predefined range of acceptable values. To accomplish this the microprocessor 44 compares the pixel count to the minimum and maximum range limits stored in the window configuration data block. If the pixel count is outside of the range, the alarm flag for the window is set at step 659. At step 660, the pixel count is saved in the results data block and the index count is incremented at step 661. Once all four of the sensor windows have been evaluated in the floating window routine, the evaluation of all of the line gauges and sensor windows is complete and the program transfers from decision block 652 to the threshold adjustment and error reporting routine shown in FIG. 38.

Figure 38:
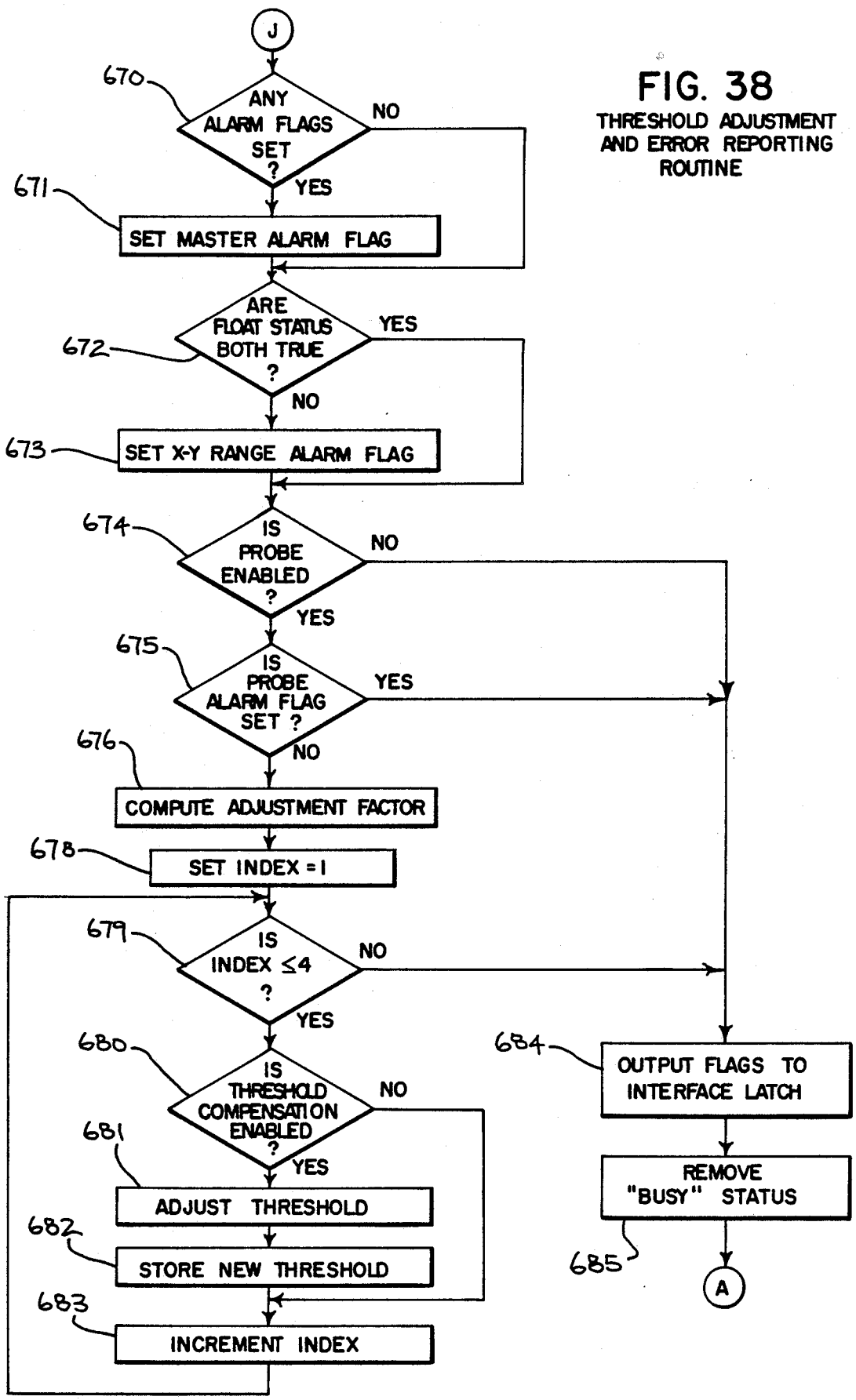
FIG. 38 is a flowchart of the routine to adjust the binarization thresholds for the vision imput module and to report any errors that have occurred during the image processing.

With reference to FIG. 38, a determination is made at step 670 as to whether any of the range alarm flags for the line gauges or sensor windows has been set. If any of the alarm flags has been set, the master alarm flag bit in the data latch of the backplane interface circuit 52 and the corresponding bit of the front panel I/0 circuit 50 are set to indicate that at least one of the sensors had a result that was outside of the predetermined range of acceptable values. The X and Y float status flags are then examined at step 672 to determine whether they are both true. If either one of them is false indicating that the corresponding line gauge was unable to sense the edge of the workpiece, the X-Y alarm flag is set at step 673.

An examination of the enable flag within the brightness probe configuration table is then conducted at step 674. If the probe is disabled, the program advances to step 684 where the various flags are set in the output latch of the backplane interface circuit 52. The VIM then removes the busy status signal from the control line of the backplane of the programable controller rack at step 685.

If the brightness probe is found to be enabled at step 674, an examination is made of the brightness probe range alarm flag at decision block 675. If the brightness probe alarm was set indicating that the measured luminance was outside the range of acceptable values, the program transfers to step 684 bypassing the adjustment of the binarization threshold. However, if the average luminance measured by the brightness probe 26 is at an acceptable value, a threshold adjustment factor is computed at step 676 by dividing the measured average luminance by the luminance reference value stored in the second word of the brightness probe data block during VIM setup. This adjustment factor is then used to redefine each of the thresholds in the binary image processor 100.

The sensor index count is then initialized to one at step 678. The index count is then tested at decision block 679 to determine if it is still pointing to one of the four sensor windows. If one of the four windows is still designated by the index, the program advances to decision block 680 where the threshold compensation flag of the designated window is checked. If the threshold is to be compensated for changes in the illumination of the workpiece, the theshold is adjusted at step 681 by multiplying the reference threshold that was stored in the sensor window data block during the setup by the adjustment factor. The new threshold value is then stored within the corresponding latch of D/A converter 102 (FIG. 5) of the binary image processor 100. The index count is incremented at step 683 so that the threshold of the next sensor window may be adjusted. Once the binarization thresholds for all of the sensor windows have been adjusted, the program branches from decision block 679 to steps 684 and 685 that have been previously described. Once these two steps have been executed, the program execution returns to node A on the flow chart of FIG. 11 where the program waits for either the setup or image trigger signal.

Periodically the processor module 3 examines the control line on the rack backplane which carries the busy signal from the VIM 5. When the processor module 3 detects the removal of the busy signal, it knows that an evaluation of a workpiece has been completed and the results have been stored within the VIM memory. The processor module 3 will then send an enable signal via a control line to the connector 55 or 56 for one of the two backplane slots in which the VIM is mounted. As noted previously, the VIM may be accessed by one of the slots to obtain the bits that have been stored in the output latch of the backplane interface circuit 52. In doing so the processor module 3 obtains a summary of the evaluation of the workpiece. For example, the processor module obtains the master decision alarm which indicates that all of the results from the various line gauge and window sensors have values that fall within the ranges that have been defined by the operator. If the control program within the processor module 3 requires detailed results of the workpiece evaluation, an enable signal is sent via a control line to the other rack slot which instructs the VIM 5 to transfer the entire results data block over the rack backplane to the processor module. Once this is accomplished, the processor module then may inspect any or all of the sensor results according to its control program.

We claim:

1. In a programmable controller having a rack with a backplane for electrically interconnecting a plurality of modules received in the rack, and a program processor for executing a program which operates a machine coupled to the programmable controller; the improvement comprising a video image processor including:
   a microprocessor which executes a program that controls the operation of the video image processor;
   means responsive to a trigger signal for acquiring a video image, said video image formed by a plurality of pixels each having a luminance;
   means for determining the position of an object within the video image;
   means for counting pixels in said video image which have predetermined characteristics, and having an output indicating the result of the counting, said means for counting including:
   (a) means for comparing the luminance of pixels in the video image to a threshold value,
   (b) a memory for storing data defining a region within the video image,
   (c) a counter,
   (d) means for shifting the region with respect to the video image in response to said means for determining, and
   (e) means responsive to said means for comparing and responsive to the shifted region for controlling the counter; and
   means, responsive to the microprocessor, for signaling the program processor that the video image processor has completed processing the image and for transmitting the output of the means for counting to the program processor via the rack backplane.

2. The programmable controller as recited in claim 1 wherein said means for acquiring a video image is responsive to a trigger signal from said program processor.

3. The programmable controller as recited in claim 1 wherein said means for counting tabulates the pixels which have a given luminance relationship to a predetermined threshold value.

4. The programmable controller as recited in claim 3 wherein said means for counting tabulates only the pixels which have the given luminance relationship and which lie within the region of the image.

5. The programmable controller as recited in claim 3 further comprising means for measuring changes in the luminance of a section of the image and varying the threshold value to correspond to changes in the luminance of the section.

6. The programmable controller as recited in claim 1 wherein said means for determining calculates a displacement of the object from a datum position in the image.

7. The programmable controller as recited in claim 6 wherein said memory stores an image of the region.

8. The programmable controller as recited in claim 1 further including means for indicating whether the output of said counting means is within a range of values.

9. An apparatus for processing a video image comprising:
   means for simultaneously converting a video signal into a plurality of binary images;
   means for defining a region in each of said binary images; and
   means for separately counting pixels within the defined regions which have a given binary value.

10. The apparatus as recited in claim 9 further comprising a memory for storing each of the binary images.

11. The apparatus as recited in claim 9 wherein said means for converting includes:
    means for storing a separate threshold level for each binary image;
    means for comparing the video signal to each of the threshold levels to produce each binary image.

12. The apparatus as recited in claim 9 wherein said means for defining a region in each binary image includes a memory for storing an image representing the region.

13. The apparatus as recited in claim 12 wherein said means for separately counting includes:
    separate means for comparing each binary image to the image representing the region defined in that binary image; and
    a plurality of separate counters each responsive to a different one of said means for comparing 14. The apparatus as recited in claim 13 wherein said memory has an address input; and said means for shifting includes means for addressing said memory having a circuit for adding an offset value to the addresses for said memory.

15. The apparatus as recited in claim 12 further comprising:
    means for determining the position of an object in the video image;
    means, responsive to said means for determining the position, for shifting at least one of the images of a region.

16. A vision input module for a programmable controller comprising:
    means for receiving a video image;
    means for defining at last one sensing region within said video image and its sensing parameters, said means for defining including a memory for storing a definition of the sensing area and its parameters;

means for determining the position of an object in said video image; and means for changing the definition of said sensing area in response to the position of the object.

17. The module of claim 16 further comprising means for storing and retrieving the sensing area definitions to and from the programmable controller.

18. The module as in claim 17 wherein the programmable controller includes means for storing multiple sets of sensing area definitions and parameters which sets may be sequentially downloaded to the module for performing different sensing operations.

19. In a programmable controller having a rack with a backplane for electrically interconnecting a plurality of modules received in the rack, and a program processor executing a program which operates a machine coupled to the programmable controller; the improvement comprising a video image processor including:

a microprocessor which executes a program that controls the operation of the video image processor;

means responsive to a trigger signal for acquiring a video image to process, said video image formed by a plurality of pixels each having a luminance;

means for counting pixels in said video image which have predetermined characteristics, and having an output indicating the result of the counting;

means, responsive to the microprocessor, for signaling the program processor that the video image processor has completed processing the image and for transmitting the output of the means for counting to the program processor via the rack backplane; and means for defining the predetermined characteristics including a video monitor, means for displaying on said monitor a menu consisting of a series of icons depicting characteristics defining functions, and means for an operator to select an icon.

20. The programmable controller as recited in claim 19 wherein said means to select an icon comprises a light pen.

* * * * *